US012586133B2

(12) United States Patent
Kumar et al.

(10) Patent No.: US 12,586,133 B2
(45) **Date of Patent: *Mar. 24, 2026**

(54) SYSTEM AND METHOD FOR COMPUTATIONAL PREDICTION AND RECOMMENDATION OF REAL-WORLD ENTITIES AND THEIR VALUE ASSERTION

(71) Applicant: Slate Technologies Inc., Pleasanton, CA (US)

(72) Inventors: Senthil Manickavasagam Kumar, Dublin, CA (US); Trevor Schick, Austin, TX (US); Nic Brathwaite, Danville, CA (US); Daniel Sullivan, San Francisco, CA (US); Steven Weibach, Lafayette, CA (US)

(73) Assignee: Slate Technologies Inc., Pleasanton, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/925,389

(22) Filed: Oct. 24, 2024

(65) Prior Publication Data

US 2025/0131505 A1      Apr. 24, 2025

Related U.S. Application Data

(63) Continuation of application No. 18/655,141, filed on May 3, 2024, now Pat. No. 12,159,313.
(Continued)

(51) Int. Cl.
*G06Q 40/06* (2012.01)
(52) U.S. Cl.
CPC .................................... *G06Q 40/06* (2013.01)
(58) Field of Classification Search
CPC .................................................... G06Q 40/06
See application file for complete search history.

(56) References Cited

U.S. PATENT DOCUMENTS 2,052,346 A      8/1936 Garrett
7,113,915 B1      9/2006 Montemayor
(Continued)

FOREIGN PATENT DOCUMENTS

CA          3238776 A1 *  5/2023    ....... G06Q 10/06316
CN      114723402 A      7/2022
(Continued)

OTHER PUBLICATIONS

Mishra et al.: Context Driven Proactive Decision Support for Hybrid Teams, Fall 2019, Association for the Advancement of Artficial Intelligence, pp. 41-57 (Year: 2019).*
(Continued)

Primary Examiner — Bijendra K Shrestha
(74) *Attorney, Agent, or Firm* — Haverstock & Owens, A Law Corporation

(57) ABSTRACT

A method for generating computational predictions associated with a real-world entity is disclosed. The method comprises analyzing knowledge from a plurality of data sources; determining investment objectives associated with the real-world entity; applying, a plurality of ensembles of machine learning models to each of the plurality of data sources to conduct a combinatorial analysis of the plurality of data sources; generating, by colonies of Artificial Intelligence (AI) colonizers, intermediary outputs; analyzing the intermediary outputs in a weighted combination to generate weighted outputs; and assembling, by a supervisory algorithm, the weighted outputs based on the investment objectives to generate a computational prediction associated with the real-world entity.

14 Claims, 12 Drawing Sheets

Related U.S. Application Data

(60) Provisional application No. 63/544,672, filed on Oct. 18, 2023.

(56) References Cited

U.S. PATENT DOCUMENTS

| | | |
|---|---|---|
| 7,283,975 B2 | 10/2007 | Broughton |
| 8,204,619 B2 | 6/2012 | Heil |
| 8,260,648 B2 | 9/2012 | Elazouni et al. |
| 8,775,229 B1 | 7/2014 | Danskin |
| 9,070,216 B2 | 6/2015 | Golparvar-Fard et al. |
| 9,189,571 B2 | 11/2015 | Loberg |
| 9,507,885 B2 | 11/2016 | Yu et al. |
| 9,996,810 B2 | 6/2018 | Augenstein et al. |
| 10,311,529 B1 | 6/2019 | Noel et al. |
| 10,452,790 B2 | 10/2019 | Kim et al. |
| 10,460,173 B2 | 10/2019 | Sasson et al. |
| 10,572,848 B2 | 2/2020 | Sen |
| 10,713,607 B2 | 7/2020 | Pettersson et al. |
| 10,846,640 B2 | 11/2020 | Goel et al. |
| 10,970,796 B2 | 4/2021 | Sasson et al. |
| 11,017,335 B1 | 5/2021 | Ponce de Leon |
| 11,100,663 B2 | 8/2021 | Nemoto et al. |
| 11,176,495 B1 | 11/2021 | Ron et al. |
| 11,208,807 B1 | 12/2021 | Lopes |
| 11,263,371 B2 | 3/2022 | Bowen et al. |
| 11,263,557 B2 | 3/2022 | Yellin |
| 11,381,726 B2 | 7/2022 | Zass |
| 11,410,111 B1 | 8/2022 | Washam et al. |
| 11,416,958 B1 | 8/2022 | Reichert et al. |
| 11,481,853 B2 | 10/2022 | Bellaish et al. |
| 11,531,943 B1 | 12/2022 | Kumar |
| 11,868,686 B2 | 1/2024 | Kumar |
| 11,868,933 B2 | 1/2024 | Kumar |
| 11,907,885 B1 | 2/2024 | Kumar |
| 12,159,313 B1 | 12/2024 | Kumar et al. |
| 2002/0156668 A1 | 10/2002 | Morrow et al. |
| 2003/0018507 A1 | 1/2003 | Flanagan |
| 2003/0200062 A1 | 10/2003 | Dessureault et al. |
| 2004/0236547 A1 | 11/2004 | Rappaport et al. |
| 2006/0059838 A1 | 3/2006 | Pimental |
| 2006/0075718 A1 | 4/2006 | Borne et al. |
| 2006/0190391 A1 | 8/2006 | Cullen et al. |
| 2006/0228962 A1 | 10/2006 | Souther et al. |
| 2007/0245300 A1 | 10/2007 | Chan et al. |
| 2007/0265724 A1 | 11/2007 | Mifsud et al. |
| 2007/0271073 A1 | 11/2007 | Mifsud et al. |
| 2008/0005079 A1 | 1/2008 | Flake et al. |
| 2008/0015823 A1 | 1/2008 | Arnold et al. |
| 2008/0040264 A1 | 2/2008 | Alin et al. |
| 2008/0077364 A1 | 3/2008 | Wakelam et al. |
| 2008/0109330 A1 | 5/2008 | Torres |
| 2008/0313110 A1 | 12/2008 | Kreamer |
| 2010/0010883 A1 | 1/2010 | Neilsen et al. |
| 2010/0153280 A1 | 6/2010 | Fox et al. |
| 2010/0235206 A1 | 9/2010 | Miller et al. |
| 2010/0325196 A1 | 12/2010 | Beckman et al. |
| 2010/0325578 A1 | 12/2010 | Mital et al. |
| 2011/0181859 A1 | 7/2011 | Long et al. |
| 2011/0231353 A1 | 9/2011 | Wang |
| 2012/0066019 A1 | 3/2012 | Hinshaw et al. |
| 2012/0131878 A1 | 5/2012 | Ivanov |
| 2012/0166177 A1 | 6/2012 | Beld et al. |
| 2013/0155058 A1 | 6/2013 | Golparvar-Fard et al. |
| 2014/0122143 A1 | 5/2014 | Fletcher |
| 2015/0193561 A1 | 7/2015 | Lindberg et al. |
| 2015/0310135 A1 | 10/2015 | Forsyth et al. |
| 2016/0048785 A1 | 2/2016 | Dommarajukrishnamaraju |
| 2016/0132828 A1 | 5/2016 | Hartung |
| 2016/0292306 A1 | 10/2016 | Migneault et al. |
| 2016/0350973 A1 | 12/2016 | Shapira et al. |
| 2016/0378861 A1 | 12/2016 | Eledath et al. |
| 2017/0337261 A1 | 11/2017 | Wang |
| 2018/0276319 A1 | 9/2018 | Tierney et al. |
| 2018/0314705 A1 | 11/2018 | Griffith et al. |
| 2018/0330258 A1* | 11/2018 | Harris .................... G06N 7/01 |
| 2018/0365593 A1 | 12/2018 | Galitsky |
| 2019/0012605 A1 | 1/2019 | Rajagopal et al. |
| 2019/0138667 A1 | 5/2019 | Benesh et al. |
| 2019/0200169 A1 | 6/2019 | Bapna et al. |
| 2019/0286895 A1 | 9/2019 | Hirvijarri |
| 2019/0294673 A1 | 9/2019 | Sapugay et al. |
| 2019/0303512 A1 | 10/2019 | Davies et al. |
| 2019/0317805 A1 | 10/2019 | Metsch et al. |
| 2020/0042915 A1 | 2/2020 | Samson |
| 2020/0057811 A1 | 2/2020 | Seegan et al. |
| 2020/0057972 A1 | 2/2020 | Renford |
| 2020/0412926 A1 | 12/2020 | Zass et al. |
| 2020/0413011 A1 | 12/2020 | Zass |
| 2021/0073694 A1 | 3/2021 | Yellin et al. |
| 2021/0081819 A1 | 3/2021 | Polleri et al. |
| 2021/0081859 A1 | 3/2021 | Goel |
| 2021/0104100 A1 | 4/2021 | Whitney et al. |
| 2021/0120206 A1 | 4/2021 | Liu et al. |
| 2021/0125124 A1 | 4/2021 | Meharwade et al. |
| 2021/0142286 A1 | 5/2021 | Hajian |
| 2021/0192099 A1 | 6/2021 | Benromano et al. |
| 2021/0287177 A1 | 9/2021 | Musialek et al. |
| 2021/0316457 A1 | 10/2021 | Kang et al. |
| 2021/0316459 A1 | 10/2021 | Kang et al. |
| 2021/0350310 A1 | 11/2021 | Tashkin |
| 2021/0383033 A1 | 12/2021 | Glenn et al. |
| 2022/0027826 A1 | 1/2022 | Makhija |
| 2022/0036275 A1 | 2/2022 | Cella et al. |
| 2022/0058552 A1 | 2/2022 | Takahashi |
| 2022/0066456 A1 | 3/2022 | Ebrahimi Afrouzi et al. |
| 2022/0067748 A1 | 3/2022 | Sheikh |
| 2022/0084140 A1 | 3/2022 | Daczko et al. |
| 2022/0130145 A1 | 4/2022 | Connary et al. |
| 2022/0215135 A1 | 7/2022 | Shortridge |
| 2022/0245353 A1 | 8/2022 | Turkkan et al. |
| 2022/0284366 A1 | 9/2022 | Kelly et al. |
| 2022/0318936 A1 | 10/2022 | Copley et al. |
| 2022/0343155 A1 | 10/2022 | Mitra |
| 2022/0358259 A1 | 11/2022 | Manish et al. |
| 2022/0405436 A1 | 12/2022 | Jung et al. |
| 2023/0153716 A1 | 5/2023 | Kumar |
| 2023/0185978 A1 | 6/2023 | Danon et al. |
| 2023/0229986 A1 | 7/2023 | Cami |
| 2023/0251631 A1 | 8/2023 | Pederson et al. |
| 2023/0274795 A1* | 8/2023 | Holzer ............... C12N 15/1089 506/8 |
| 2023/0281358 A1 | 9/2023 | Kumar et al. |
| 2023/0315952 A1 | 10/2023 | Kumar |
| 2023/0325929 A1 | 10/2023 | Dance et al. ......... G06N 3/044 |
| 2024/0144373 A1* | 5/2024 | Wu |
| 2024/0394422 A1 | 11/2024 | Kumar |

FOREIGN PATENT DOCUMENTS

| | | | |
|---|---|---|---|
| KR | 102496584 B1 | 2/2023 | |
| WO | WO-2019216825 A1* | 11/2019 | ......... G06Q 30/0631 |
| WO | 2020113305 A1 | 6/2020 | |
| WO | 2021050131 A1 | 3/2021 | |
| WO | 2022026520 A1 | 2/2022 | |
| WO | 2023192017 A1 | 10/2023 | |
| WO | 2023192237 A1 | 10/2023 | |
| WO | 2023192243 A1 | 10/2023 | |

OTHER PUBLICATIONS

Nosta, John: AI and the Arrival of the Cognitive Colonizers: Is AI quietly reshaping how we think? Jul. 17, 2025, Psychology Today, pp. 1-4 (Year: 2025).*

Wu, D.J.: Shop Floor Production Community Design: Artificial Agents Based Approach, 2000, The Wharton School, Univ. of Pennsylvania, Proceedings of the 33rd Hawaii International Conference on System Sciences, pp. 1-9 (Year: 2000).*

Notification of Transmittal of the International Search Report and the Written Opinion of the International Searching Authority, or the Declaration issued on Dec. 31, 2024 for PCT Application No. PCT/2024/048035.

(56) References Cited

OTHER PUBLICATIONS

First Office Action dated Sep. 18, 2025 issued for Canadian Patent Application No. 3,246,133.

International Searching Authority, "International Search Report and Written Opinion" in application No. PCT/US2023/012778, dated May 16, 2023, 18 pages.

International Searching Authority, "International Search Report and Written Opinion" in application No. PCT/US2023/014257, dated Jun. 2, 2023, 14 pages.

Jun Yang et al., Construction Performance Monitoring Via Still Images, Time-Lapse Photos and Video Streams; Now Tomorrow, and the Future, Advance Engineering Informatics, vol. 29, Issue 2, 2015, pp. 211-224, ISSN 1474-0346. (Year 2015).

Venkatasubramanian, Karthik, "Using AL and Machine Learning to Predict Construction Schedule Delays", Oracle Construction and Engineering Blog, Jul. 1, 2021, pp. 1-5.

Fitzsimmons, John et al., "Improving Construction Project Schedules Before Execution", 37th International Symposium on Automation and Robotics in Construction (ISARC 2020), pp. 1-8.

Yang et al., ("Adopting Building Information Modeling (BIM) for the Development of Smart Buildings: A Review of Enabling Applications and Challenges", Hindawi Advances in Civil Engineering, 2010, pp. 1-26) (Year 2010).

Valdes et al. ("Applying Systems Modeling Approaches to Building Construction", ISARC 2016, pp. 1-9 (Year 2016).

Bortolini et al. ("Site logistics planning and control for engineer-to-order prefabricated building systems using BIM 4D modelling", Automation in Construction 98 (2019) 248-264) (Year 2019).

ChatGPT in Real Estate: Enhancing Property Search and Customer Queries, Open AI, Sep. 29, 2023, 10 pages, https://dasha.ai/en-us/blog/chatgpt-in-real-estate-enhancing-property-search-and-customer-queries.

6 Types of Agents in AI (Artificial Intelligence) for your Business, Tanisha Verma, Aug. 16, 2023, 24 pages, https://www.rezo.ai/our-blogs/types-of-agents-in-ai.

CrewAI Unleashed: Future of Al Agent Teams, Joao Moura, Dec. 21, 2023, 10 pages, https://blog.langchain.dev/crewai-unleashed-future-of-ai-agent-teams/.

International Searching Authority, "International Search Report" and Written Opinion in application No. PCT/US2022/047823, dated Dec. 7, 2022, 10 pages.

Taiwan Patent Office, "Office Action", in application No. 111143737, dated Apr. 17, 2023, 8 pages.

International Searching Authority, "International Search Report" and "Written Opinion" in application No. PCT/US2023/015098, dated Apr. 17, 2023, 7 pages.

International Searching Authority, "International Search Report" and "Written Opinion" in application No. PCT/US2023/016515, dated Jun. 22, 2023, 8 pages.

International Searching Authority, "International Search Report" and "Written Opinion" in application No. PCT/US2023/016521, dated Jul. 12, 2023, 18 pages.

International Preliminary Report on Patentability, International Application No. PCT/US2022/047823, mailed May 30, 2024.

Malakar, et al., Proceedings of the 30th International Workshop on Bayesian Inference and Maximum Entropy Methods in Science and Engineering. AIP Conference Proceedings, vol. 1305. AIP Conference Proceedings, vol. 1305, Issue 1, 2010, pp. 157-164 (Year:2010).

Cedeno-Mieles, et al., Networked Experiments and Modeling for Producing Collective Identity in a Group of Human Subjects Using an Iterative Abduction Framework, Social Network Analysis and Mining, 10:11, Jan. 7, 2020, pp. 1-43 (Year:2020).

Notification of Transmittal of the International Search Report and the Written Opinion of the International Searching Authority of the Declaration from International Application No. PCT/US24/30726, dated Aug. 7, 2024, 13 pages.

Notification Concerning Transmittal of Copy of International Preliminary Report on Patentability for PCT Patent Application No. PCT/US2023/012778 dated Sep. 19, 2024.

Notification Concerning Transmittal of Copy of International Preliminary Report on Patentability for PCT Patent Application No. PCT/US2023/014257 dated Sep. 19, 2024.

Notification Concerning Transmittal of Copy of International Preliminary Report on Patentability for PCT Patent Application No. PCT/US2023/016515 dated Oct. 10, 2024.

Notification Concerning Transmittal of Copy of International Preliminary Report on Patentability for PCT Patent Application No. PCT/US2023/016521dated Oct. 10, 2024.

Notification Concerning Transmittal of Copy of International Preliminary Report on Patentability for PCT Patent Application No. PCT/US2023/015098 dated Oct. 10, 2024.

Russell Thornley, "Measuring strategic vertical alignment of project portfolio execution using a rho-squared coefficient: theory, application, and an exploratory case study", Jul. 18, 2012, PMI Research and Education Conference. (Year:2012).

Notification of Transmittal of the International Search Report and the Written Opinion of the International Searching Authority, or the Declaration issued on Mar. 19, 2025 for PCT Application No. PCT/2025/011990.

Notification Concerning Transmittal of International Preliminary Report on Patentability (Chapter I of the Patent Corporation Treaty) dated Dec. 4, 2025 for PCT Patent Application No. PCT/US2024/030726.

Castano, et al., Thematic Clustering and Exploration of Linked Data, Lecture Notes in Computer Science (LNCS)7538, pp. 157-175,2012 (Year 2012).

Zhou, et al., Contectual Ensemble Network for Semantic Segmentation, Pattern Recognition, vol. 122, Feb. 2022, 108290, pp. 1-11 (Year:2022).

Calikus, et al., Wisdom of the Contexts: Active Ensemble Learning for Contestual Anomaly Detection, arXiv:2101.11560v4[-cs.LG] pp. 1-46, Oct. 4, 2022 (Year: 2022).

Gao, et al., ComFact: A Benchmark for Linking Contextual Commonsense KNwledge, Findings of the Association for Computational Linguistics: EMNLP 2022, pp. 1656-1675, Dec. 11, 2022 (Year: 2022).

Mishra et al., Context Driven Proactive Decision Support for Hybrid Teams, Fall 2019, Association for the Advancement of Artificial Intelligence, pp. 41-57 (Year:2019).

Li et al.: Collaborative Filtering Algorithm with Social Information and Dynamic Windows, 2022, Applied Intelligence, Springer, pp. 5261-5272 (Year: 2022).

* cited by examiner 10.8% change in the mortgage rate and 11% change in unemployment rate and -3.384% change in population growth has the following projected impact after 6 months lag:

Price Per Sq. Ft (6 months)

-21.97%

Home sales (6 months)

-10.4%

Days on market (6 months)

8.01%

Monthly PPSF residue percentage Vs monthly mortgage rate

Monthly PPSF residue percentage    Monthly mortgage rate

Monthly PPSF residue percentage Vs monthly unemployment rate

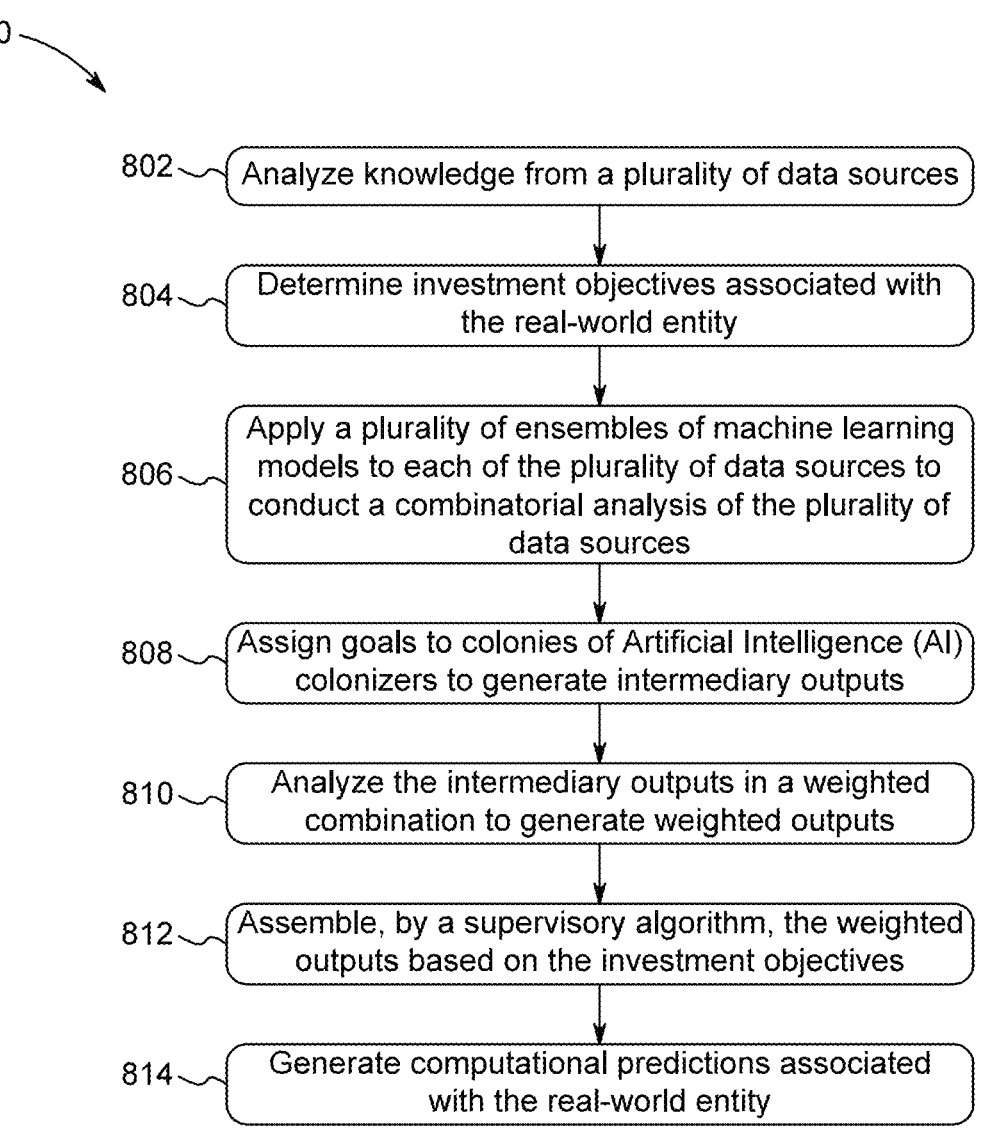

800

802 — Analyze knowledge from a plurality of data sources

804 — Determine investment objectives associated with the real-world entity

806 — Apply a plurality of ensembles of machine learning models to each of the plurality of data sources to conduct a combinatorial analysis of the plurality of data sources 808 — Assign goals to colonies of Artificial Intelligence (AI) colonizers to generate intermediary outputs 810 — Analyze the intermediary outputs in a weighted combination to generate weighted outputs 812 — Assemble, by a supervisory algorithm, the weighted outputs based on the investment objectives 814 — Generate computational predictions associated with the real-world entity

FIG. 7

SYSTEM AND METHOD FOR COMPUTATIONAL PREDICTION AND RECOMMENDATION OF REAL-WORLD ENTITIES AND THEIR VALUE ASSERTION

RELATED APPLICATIONS

This application is a continuation of co-pending U.S. patent application Ser. No. 18/655,141, filed on May 3, 2024, and titled "SYSTEM AND METHOD FOR COMPUTATIONAL PREDICTION AND RECOMMENDATION OF REAL-WORLD ENTITIES AND THEIR VALUE ASSERTION." which claims priority under 35 U.S.C. § 119(e) of the U.S. Provisional Patent Application Ser. No. 63/544,672, filed Oct. 18, 2023, and titled "System And Method For Computational Prediction And Recommendation Of Real-World Entities And Their Value Assertion" which is hereby incorporated by reference in its entirety.

This application is related to U.S. Pat. No. 11,531,943, issued Dec. 20, 2022, and titled "Artificial Intelligence Driven Method and System for Multi-factor Optimization of Schedules and Resource Recommendations for Smart Construction," U.S. Provisional Application No. 63/324,715, filed Mar. 29, 2022, and titled "System and Methods for Intent-Based Factorization and Computational Simulation," and U.S. patent application Ser. No. 17/894,418, filed Aug. 24, 2022, titled "System and Method for Computational Simulation and Augment/Virtual Reality in a Construction Environment," entire contents of which are hereby incorporated herein by reference for all purposes as if fully set forth herein.

FIELD OF THE INVENTION

The present disclosure relates generally to artificial intelligence (AI) and machine learning (ML) driven computational predictions related to real-world entities. Specifically, the present disclosure relates to real-world entities investments, wherein recommendations are provided associated with a value assertion of real-world entities based on various forms of knowledge assimilation, knowledge generation and computational simulation techniques.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventionally, real estate and/or real-world entity value assertions and forecasts are driven by both short-term opportunities and long-term projections. A short-term objective, for example, may be to identify localities where one can invest in the next 3 to 6 months or within a year. This means identification of, for example, localities or geographies where there is already a prepared set of land that is available for immediate construction. That is, it is important to identify where to acquire land for immediate construction, build outs and sale. A long-term objective, for example, may be to invest in areas that will become attractive in, say, a few years from now. Traditionally, these are highly speculative, and hence highly risky investment options. Historically neither the value nor the time to realize returns on investments can be predicted with accuracy.

SUMMARY OF THE INVENTION

In some embodiments, systems that provide intelligence aided solutions for creation of strategies, and value-assertion, for investment projects, are described. The executable and operational systems (and their associated subsystems) provide computational predictions and recommendations associated with an investment objective.

The following represents a summary of some embodiments of the present disclosure to provide a basic understanding of various aspects of the disclosed herein. This summary is not an extensive overview of the present disclosure. It is not intended to identify key or critical elements of the present disclosure or to delineate the scope of the present disclosure. Its sole purpose is to present some embodiments of the present disclosure in a simplified form as a prelude to the more detailed description that is presented below.

Embodiments of an AI-based system and a corresponding method are disclosed that address at least some of the above challenges and issues. In some embodiments, the subject matter of the present disclosure discloses a method for generating computational predictions associated with a real-world entity in a computing environment. The method comprises analyzing knowledge from a plurality of data sources, wherein the analyzing includes self-generating one or more of the plurality of data sources based on predictive analysis on the plurality of data sources; determining one or more investment objectives associated with the real-world entity; applying, a plurality of ensembles of machine learning models to each of the plurality of data sources to conduct a combinatorial analysis of the plurality of data sources, wherein the combinatorial analysis comprises: assigning one or more goals to one or more colonies of Artificial Intelligence (AI) colonizers, each colony of AI colonizers comprising a lead colonizer and a plurality of captive agents navigating collectively towards the one or more goals to generate one or more intermediary outputs, wherein the one or more goals correspond to the one or more investment objectives; analyzing the one or more intermediary outputs in a weighted combination to generate weighted outputs; and assembling, by a supervisory algorithm, the weighted outputs based on the one or more investment objectives to generate a computational prediction associated with the real-world entity.

In some embodiments of the present disclosure, self-generating the one or more of the plurality of data sources further includes analyzing one or more of historical data sources and current data sources to compute a predictive data source.

In some embodiments of the present disclosure, the method further includes training the plurality of ensembles of machine learning models using training data including data relating to the real-world entity and one or more inputs received from a user; and applying the trained plurality of ensembles of machine learning models to each of the plurality of data sources to conduct the combinatorial analysis.

In some embodiments of the present disclosure, the combinatorial analysis further includes identifying, by the lead colonizer, a set of relevant features in the plurality of data sources; analyzing, by the lead colonizer, the set of relevant features in view of the one or more goals to generate a positive reinforcement metrics and an associated path; and incentivizing, by the lead colonizer, using the positive reinforcement metrics, the plurality of captive agents to move towards the associated path.

In some embodiments of the present disclosure, the combinatorial analysis further includes subscribing, by one or more of the plurality of captive agents, to the lead colonizer based on the positive reinforcement metrics; and collaborating and moving, by the one or more of the plurality of captive agents, towards the associated path as incentivized by the lead agent.

In some embodiments, the combinatorial analysis further includes subscribing, by one or more of the plurality of captive agents, to the lead colonizer based on the positive reinforcement metrics; and collaborating and moving, by the one or more of the plurality of captive agents, towards the associated path as incentivized by the lead agent.

In some embodiments, the combinatorial analysis further includes unsubscribing, by one or more of the plurality of captive agents, to the lead colonizer based on the positive reinforcement metrics; and moving, by the one or more of the plurality of captive agents, towards another path, different from the associated path as incentivized by the lead agent.

In some embodiments, the combinatorial analysis further includes collaborating, by the lead colonizer, with one or more peer colonizers, wherein the one or more peer colonizers include lead colonizers in other colonies of AI colonizers; and generating, based on the collaborating, the one or more intermediary outputs.

In some embodiments, generating the weighted output further includes assigning, based on a training process, weights to each of the one or more intermediary outputs; generating a first weighted output based on the assigned weights; determining, a difference between the first weighted output and an expected output; and adjusting the assigned weights to minimize the difference between the first weighted output and an expected output.

In some embodiments, generating the computational prediction associated with the real-world entity comprises generating a time-based prediction, wherein the time-based prediction includes a dynamic time window such that the computational prediction is updated on moving the dynamic time window.

In some embodiments, the subject matter of the present disclosure is able to relate to a system for generating computational predictions associated with a real-world entity in a computing environment. In some embodiments, the system includes a Correlation Module having a controller configured to analyze knowledge from a plurality of data sources, including self-generating one or more of the plurality of data sources based on predictive analysis on the plurality of data sources; determine one or more investment objectives associated with the real-world entity; apply, a plurality of ensembles of machine learning models to each of the plurality of data sources to conduct a combinatorial analysis of the plurality of data sources, wherein the combinatorial analysis comprises: assigning one or more goals to one or more colonies of Artificial Intelligence (AI) colonizers, each colony of AI colonizers comprising a lead colonizer and a plurality of captive agents navigating collectively towards the one or more goals to generate one or more intermediary outputs, wherein the one or more goals correspond to the one or more investment objectives; analyzing the one or more intermediary outputs in a weighted combination to generate weighted outputs; and assemble using a supervisory algorithm, the weighted outputs based on the one or more investment objectives to generate a computational prediction associated with the real-world entity.

In some embodiments of the present disclosure, the controller is further configured to analyze one or more of historical data sources and current data sources to compute a predictive data source.

In some embodiments of the present disclosure, the controller is further configured to train the plurality of ensembles of machine learning models using training data including data relating to the real-world entity and one or more inputs received from a user; and apply the trained plurality of ensembles of machine learning models to each of the plurality of data sources to conduct the combinatorial analysis.

In some embodiments of the present disclosure, the controller is further configured to identify, by the lead colonizer, a set of relevant features in the plurality of data sources; analyze, by the lead colonizer, the set of relevant features in view of the one or more goals to generate a positive reinforcement metrics and an associated path; and incentivize, by the lead colonizer, using the positive reinforcement metrics, the plurality of captive agents to move towards the associated path.

In some embodiments of the present disclosure, the controller is further configured to subscribe the one or more of the plurality of captive agents to the lead colonizer based on the positive reinforcement metrics; and collaborate and move the one or more of the plurality of captive agents towards the associated path as incentivized by the lead agent.

In some embodiments of the present disclosure, the controller is further configured to unsubscribe the one or more of the plurality of captive agents to the lead colonizer based on the positive reinforcement metrics; and move the one or more of the plurality of captive agents towards another path, different from the associated path as incentivized by the lead agent.

In some embodiments of the present disclosure, the controller is further configured to collaborate the lead colonizer with one or more of peer colonizers, wherein the one or more peer colonizers include lead colonizers in other colonies of AI colonizers; and generate, based on the collaboration, the one or more intermediary outputs.

In some embodiments of the present disclosure, the controller is further configured to assign weights to each of the one or more intermediary outputs based on a training process; generate a first weighted output based on the assigned weights; determine a difference between the first weighted output and an expected output; and adjust the assigned weights to minimize the difference between the first weighted output and an expected output.

In some embodiments of the present disclosure, the controller is further configured to generate a time-based prediction as the computational prediction, wherein the time-based prediction includes a dynamic time window such that the computational prediction is updated on moving the dynamic time window.

In some embodiments, the subject matter of the present disclosure relates to non-transitory computer-readable storage medium, having stored thereon a computer-executable program which, when executed by at least one processor, causes the at least one processor to analyze knowledge from a plurality of data sources, including self-generating one or more of the plurality of data sources based on predictive analysis on the plurality of data sources; determine one or more investment objectives associated with the real-world entity; apply a plurality of ensembles of machine learning models to each of the plurality of data sources to conduct a combinatorial analysis of the plurality of data sources, wherein the combinatorial analysis comprises: assigning one or more goals to one or more colonies of Artificial Intelligence (AI) colonizers, each colony of AI colonizers comprising a lead colonizer and a plurality of captive agents navigating collectively towards the one or more goals to generate one or more intermediary outputs, wherein the one or more goals correspond to the one or more investment objectives; and analyzing the one or more intermediary outputs in a weighted combination to generate weighted outputs; assemble, using a supervisory algorithm, the weighted outputs based on the one or more investment objectives to generate a computational prediction associated with the real-world entity.

In some embodiments of the present disclosure, the computer-executable program further causes the at least one processor to train the plurality of ensembles of machine learning models using training data including data relating to the real-world entity and one or more inputs received from a user; and apply the trained plurality of ensembles of machine learning models to each of the plurality of data sources to conduct the combinatorial analysis.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Further advantages of the invention will become apparent by reference to the detailed description of disclosed embodiments when considered in conjunction with the drawings:

FIG. 7 illustrates a sequential flow diagram for generating computational predictions associated with a real-world entity, in accordance with the embodiments presented herein

DETAILED DESCRIPTION

Figure 1:
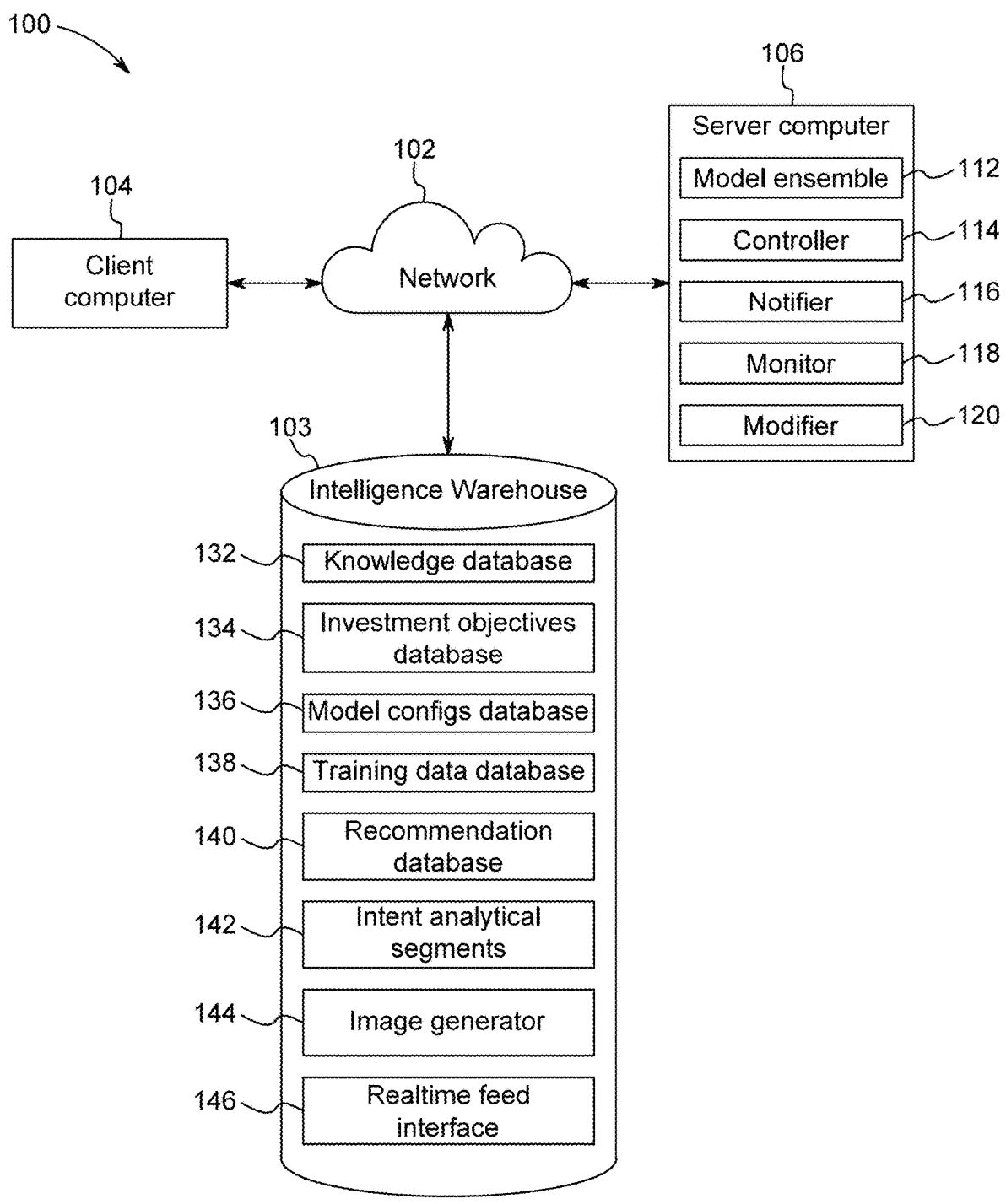
FIG. 1 illustrates an exemplary network architecture, according to some embodiments.

The following detailed description is presented to enable a person skilled in the art to make and use the disclosure. For purposes of explanation, specific details are set forth to provide an understanding of the present disclosure. However, it will be apparent to one skilled in the art that these specific details are not required to practice the disclosure. Descriptions of specific applications are provided only as representative examples. Various modifications to the preferred embodiments will be readily apparent to one skilled in the art, and the general principles defined herein may be applied to other embodiments and applications without departing from the scope of the disclosure. The present disclosure is not intended to be limited to the embodiments shown but is to be accorded the widest possible scope consistent with the principles and features disclosed herein.

Typically investing in a land bank for future build outs, identification of locale for building family dwelling, single and multi-family, societal facilities to support those communities, factories, commercial centers, building for example a set of retail outlets, electrical substations and related infrastructure facilities are driven by both short-term opportunities and long-term intelligence driven projections. A short-term objective, for example, relates to localities or geographies where there can be land that can be procured and/or prepared for immediate consumption, build, use, and factors in the set objectives that includes financial objectives, environmental objectives, societal objectives, and honors regional guidelines and local regulations. This provides an opportunity to invest in real-world entities, such as land, which may have been prepared for build or needs to be prepared for build in these localities as one can build say, houses or commercial buildings in a short period of time, sell them, and realize maximized Return on that Investment (ROI) to meet a specific objective. That is, it is beneficial to identify where to acquire land for immediate construction and sale. Identification of areas to build factories and/or to prefabricate sections of a building is beneficial as well. These prefabrication factories will have different evaluation criteria for feasibility and financial goals. Other short-term objectives are contemplated.

Accordingly, there is a need for technical solutions that address the needs described above, as well as other inefficiencies of the state of the art. Accordingly, there is a need in the art to intelligently predict and provide recommendations associated with investment in real-world entities.

The disclosed methods and systems, in addition to identifying land are also able to specify the pace with which to build the entities (for example, houses), how many to build, when to start construction, how much to price the entities, where to procure construction materials from, shortest path to ship them, when to procure these materials, how much to procure, and where to store them.

The disclosed methods and systems are also able to recommend a design for a building (for example, houses) with floor plans to maximize land utilization. In some embodiments, the system then generates a Construction Schedule to optimize the construction process and is able to provide recommendations on where to source the materials, which suppliers to source it from, for example, taking into consideration prior experiences and/or data. In some embodiments, part of the recommendation from the system is able to include an analysis of ROI metric. That is, the system is able to analyze whether capital invested in procuring the land yields a better ROI at a given time compared to investing that capital elsewhere and is also able to project the ROI metric as part of the generated recommendations. Besides the initial recommendation, the system's recommendations are dynamic and are able to adapt to potentially changing market and/or environmental conditions. For example, if the system detects a prolonged delay in house sales, the system will monitor this situation and adjust the velocity coefficient of its recommendations.

Further, a long-term objective, for example, may be to invest in areas that will become profitable by a large margin in, say, a few years from now. That is, to meet this objective, it may be required to identify investment opportunities in areas where the investment cost is low at present, and where the land and/or asset value is expected to appreciate significantly. Further, it may be desired to identify areas where development and/or construction activities can be supported in the future. Other long-term objectives are contemplated.

The first objective (e.g., short-term objective) and the second objective (e.g., long-term objective) is, at least partially, driven by sales velocity and consumption appetite. For example, how long will it take to complete the construction project, a known constraint, must be combined with unknown constraints, such as, how long will it take to sell the constructed project in the particular geography, the projected selling price, how many houses are expected to sell (sales velocity), when the construction should begin, among other things, to determine the successful outcome of an investment.

Traditionally, these are speculative parameters, and hence these investments are prone to situational variance. Neither the value nor the time to realize returns on investments are able to be predicted with accuracy in traditional systems.

The present disclosure provides for a system and method for computational analysis, prediction, and recommendation of real-world entities and their value assertion. Real-world entities may include, for example, land bank investments, that is, accumulation of land for future value appreciation based on set financial objectives. In some embodiments, the disclosed system and method is able to predict, for example, how long to hold the land, recommended time to start the construction, type and number of houses to build, recommended price for these dwellings, when should the permits be obtained, recommended factory location to manufacture house components, and local and/or regional guidelines to adopt. In addition, the system is also able to predict and/or recommend construction of houses for rental, rental price at a given period of time, financial guidance on conversion of rental to owned homes by renters, and the like.

Embodiments of the present disclosure describe a system (in an example, system 100 as depicted in FIG. 1) that is configured to ingest, assimilate, infer, and synthesize various data inputs, human intellect and knowledge from events (in an example, real world events), entities, and processes. This is then used to simulate, forecast and predict the future appreciation in investment. In some embodiments, the knowledge source is both domain specific as well as correlational knowledge from a variety of sources (in an example, the sources are unrelated to one another). Further, in some embodiments, the disclosed system is configured to create or generate additional knowledge based on other learnt knowledge with focus on value assertion of real-world entities. In some embodiments, the system is able to be implemented on a server computer that is accessible by one or more client computers via a network. A server computer disclosed herein broadly represents one or more computers, such as one or more desktop computers, a server farm, a cloud computing platform (like Amazon EC2, Google Cloud, container orchestration (Kubernetes, Docker)), or a parallel computer, virtual computing instances in public or private datacenters, and/or instances of a server-based application. The server is able to be coupled to a data repository including one or more databases storing information related to construction projects.

FIG. 1 illustrates an example system (100) for computational prediction and recommendation of real-world entities and their value assertion, according to some embodiments. FIG. 1 illustrates an example networked computer system 100 with which various embodiments of the present disclosure may be implemented. FIG. 1 is shown in simplified, schematic format for purposes of illustrating a clear example and other embodiments may include more, fewer, or different elements. FIG. 1 and the other drawing figures, and all of the description and claims in this disclosure are intended to present, disclose and claim a technical system and technical methods. The technical system and methods as disclosed include specially programmed computers, using a special-purpose distributed computer system design and instructions that are programmed to execute the functions that are described. These elements execute to provide a practical application of computing technology to the problem of optimizing schedule, resource allocation, and work sequencing for AEC planning and execution. In this manner, the current disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system 100 includes a client computer(s) 104, a server computer 106, and an intelligence warehouse 103, which are communicatively coupled directly or indirectly via network(s) 102. In some embodiments, the server computer 106 broadly represents one or more computers, such as one or more desktop computers, server computers, a server farm, a cloud computing platform, a parallel computer, virtual computing instances in public or private datacenters, and/or instances of a server-based application. In some embodiments, the server computer 106 is able to be accessible over the network 102 by the client computer 104 to request a schedule or a resource recommendation. The client computer 104 is able to include a desktop computer, laptop computer, tablet computer, smartphone, or any other type of computing device that allows access to the server computer 106. The elements in FIG. 1 are intended to represent one workable embodiment but are not intended to constrain or limit the number of elements that could be used in other embodiments.

In some embodiments, the server computer 106 includes one or more computer programs or sequences of program instructions in organization. Such organization implements artificial intelligence/machine learning algorithms to generate data pertaining to various requirements, such as design consideration factors in a construction project, controlling functions, notifying functions, monitoring functions, and modifying functions. A set of diverse or even mutually exclusive programs or sequences of instructions are organized together to implement diverse functions to generate data associated with design consideration factors. Such set is referred to herein as a model ensemble 112 to implement an ensemble learning. Programs or sequences of instructions organized to implement the controlling functions are able to be referred to herein as a construction schedule supervisor controller 114 (referred to as "controller 114" herein). Programs or sequences of instructions organized to implement the notifying functions may be referred to herein as a notifier 116. Programs or sequences of instructions organized to implement the monitoring functions are able to be referred to herein as an efficiency analysis and process monitor 118 (referred to as "monitor 118" herein). Programs or sequences of instructions organized to implement the modifying functions are able to be referred to herein as a modifier 120. In some embodiments, the controller 114, the notifier 116, the monitor 118 and the modifier 120 are able to be integrated together as a system on chip or as separate processors/controllers/registers. Accordingly, the respective functions of the controller 114, the notifier 116, the monitor 118, and the modifier 120 essentially correspond to processing or controller functions.

In some embodiments, the model ensemble 112, the controller 114, the notifier 116, the monitor 118, and/or the modifier 120 is part of an artificial intelligence (AI) system implemented by the server computer 106. In some embodiments, the networked computer system 100 is an AI system and is able to include the client computer 104, the server computer 106, and the intelligence warehouse 103 that are communicatively coupled to each other. An example AI-based system is described in U.S. Pat. No. 11,531,943, issued Dec. 20, 2022, and titled "Artificial Intelligence Driven Method and System for Multi-factor Optimization of Schedules and Resource Recommendations for Smart Construction," the entire contents of which are hereby incorporated by reference for all purposes as if fully set forth herein. In some embodiments, one or more components of the server computer 106 include a processor configured to execute instructions stored in a non-transitory computer readable medium.

In some embodiments, the model ensemble 112 is able to include a plurality of modules, and each of the plurality of modules is able to include an ensemble of one or more AI models (e.g., Language Model, Transformer Model, Multi-layer Perceptron, Lucas-Kanade, Adaptive Image Thresholding, Graph Cut Optimization, You Only Look Once, Support Vector Machines, Bayesian learning, K-Nearest Neighbor, Decision Graph) to process a corresponding data feed. The data feed in turn corresponds to current data received in real-time from data sources such as a local or remote database as corresponding to the knowledge database 132. Each module, which is a combination of plurality of ML modules, is programmed to receive a corresponding data feed from the knowledge database 132. Based on pertinent segments or attributes of the data feed mapping with a function objective(s), a respective module determines or shortlists an intermediary data set. For example, the inter-mediary data set is able to include, but is not limited to, a semantic interpretation of accrued and incoming data, a dynamic data ontology, weighted relationship amongst data segments, formulation of knowledge graph intermediate vertices and edges and that includes influencing factors in a construction project. Further, the data feed is defined by a data structure comprising a header that includes metadata or tags at an initial section or a header of the data feed, such that the metadata or tags identify segments and corresponding data types. Alternatively, in absence of header, the metadata or tags are able to be mixed with payload in the data feed. For example, in some embodiments, each data segment of the data feed includes metadata indicating a data type that the data segment pertains to. If the data type corresponds with the function objective of the respective module, then the respective module will process that data segment. The intermediary data sets are then able to be used by the controller 114 to execute one or more actions based on user inputs and/or objectives.

In some embodiments, the model ensemble 112 is able to include multiple models, such as classifiers or experts, strategically generated and combined to solve a particular computational intelligence problem. Ensemble learning is primarily used to improve the (classification, prediction, function approximation) performance of a model, or reduce the likelihood of an unfortunate selection of a poor one. In an example, an ML model selected for gathering a user intent from an input is different from an ML model required for processing a statistical input for sensitivity. The Model Ensemble is able to include machine learning techniques, deep learning techniques, neural networks, deep learning with hidden layers, or a combination of these techniques.

In some embodiments, the notifier 116 is programmed to provide notifications to the user. The notifier 116 is able to receive such notifications from the controller 114 and the intelligence warehouse 103. The notifications are able to include, but not limited to, audio, visual, or textual notifications in the form of indications or prompts. In some embodiments, the notifications are able to be indicated in a user interface (e.g., a graphical user interface) to the user. In one example, the notifications are able to include, but are not limited to, recommendations and/or alerts associated with a real-world entity investment objective. In another example, a notification is able to include graphical representation of computational predictions associated with one or more real-world entities. In another example, a notification allows an avatar or personified animation of the user to navigate the virtual environment for visual introspection through a virtual reality headgear worn over the head and/or a stylus pen held in hand as known in the state of the art. Based on a head or limb movement of the user wearing the virtual reality headgear, the avatar is able to walk-through or drive-through various virtual locations of the metaverse. In another example, a notification facilitates such avatar to make real-time changes/updates/annotations that affect the investment objective and/or project.

In some embodiments, the monitor 118 is programmed to receive feedback that is used to execute corrections and alterations at the controller 114 side to fine tune decision making. For example, the monitor 118 is able to be programmed to receive data feeds from one or more external sources associated with an investment project.

In some embodiments, the modifier 120 is programmed to receive modification data to update existing artificial intelligence models in the system 100 and to add new artificial intelligence models to the system 100. In some embodiments, modification data is able to be provided as input by the user via an input interface (e.g., a graphical user interface). In some embodiments, the modification data is able to be determined automatically through external sources and/or databases.

In some embodiments, in keeping with sound software engineering principles of modularity and separation of function, the model ensemble 112, the controller 114, the notifier 116, the monitor 118, and the modifier 120 are each implemented as a logically separate program, process, or library. These elements are also able to be implemented as hardware modules or a combination of both hardware and software modules without limitation.

Computer executable instructions described herein are able to be in machine executable code in the instruction set of a CPU and may be compiled based upon source code written in Python, JAVA, C, C++, OBJECTIVE-C, or any other human-readable programming language or environment, alone or in combination with scripts in JAVASCRIPT, other scripting languages and other programming source text. In some embodiments, the programmed instructions are able to also represent one or more files or projects of source code that are digitally stored in a mass storage device such as non-volatile RAM or disk storage, in the systems of FIG.

1 or a separate repository system, which when compiled or interpreted cause generation of executable instructions that in turn upon execution cause the computer to perform the functions or operations that are described herein with reference to those instructions. In other words, the figure is able to represent the manner in which programmers or software developers organize and arrange source code for later compilation into an executable, or interpretation into bytecode or the equivalent, for execution by the server computer 106.

In some embodiments, the server computer 106 is able to be communicatively coupled to the intelligence warehouse 103 that includes a knowledge database 132, an investment objectives database 134, a model configuration database 136, a training data database 138, a recommendation database 140, an intent analytical segments 142, an image generator 144, and a real time feed interface 146.

In some embodiments, the knowledge database 132 is able to store a plurality of data feeds collected from various sources such as a construction site or an AEC site, third-party paid or commercial databases, and real-time feeds, such as RSS, or the like. In some embodiments, a data feed is able to include data segments pertaining to macro and micro economic conditions, population demographics, quality of life, economic indicators, in-progress and post-construction data, inventory utilization and forecast data, regulatory data, global event impact data, supply chain analysis data, equipment & Internet of Things (IoT) metric analysis data, labor/efficiency data, and/or other data that are provided to the modules of the model ensemble 112 in line with respective investment objective(s). Each data segment is able to include metadata indicating a data type of that data segment. As described herein, the real-time data, near real-time data, and collated data are received by the monitor 118 and are processed by various components of the server computer 106 depending on the user intent and investment objectives.

In some embodiments, the model configuration database 136 is able to include configuration data, such as parameters, gradients, weights, biases, and/or other properties, that are required to run the artificial intelligence models after the artificial intelligence models are trained.

In some embodiments, the training data database 138 is able to include training data for training one or more artificial intelligence models of the system 100. The training data database 138 is continuously updated with additional training data obtained within the system 100 and/or external sources. Training data includes historic customer data and synthetically algorithm-generated data tailored to test efficiencies of the different artificial intelligence models described herein. Synthetic data is able to be authored to test a number of system efficiency coefficients. This synthetic data is able to include false positive and negative recommendation rates, model resiliency, and model recommendation accuracy metrics.

In some embodiments, the recommendation database 140 is able to include recommendation data, such as recommended actions associated with an investment project. The intent analytical segments database 142 is able to parse, identify, store, and analyze analytical portions of user inputs related to an intent of a user. In some embodiments, the image generator database 144 is able to convert non-graphic data feeds to graphic and/or images for further analysis and/or depiction. Further, in some embodiments, the real-time feed interface 146 is able to provide real-time data, such as, a live camera feed, to the intelligent warehouse 103.

In some embodiments, the intelligence warehouse 130 includes additional databases storing data that is able to be used by the server computer 106. Each database 132, 134, 136, 138, 140, 142, 144, and 146 is able to be implemented using memory, e.g., RAM, EEPROM, flash memory, hard disk drives, optical disc drives, solid state memory, or any type of memory suitable for database storage.

The network 102 broadly represents a combination of one or more local area networks (LANs), wide area networks (WANs), metropolitan area networks (MANs), global interconnected internetworks, such as the public internet, or a combination thereof. Each such network is able to use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are able to be configured to connect to the network 102 and the disclosure presumes that all elements of FIG. 1 are communicatively coupled via the network 102. The various elements depicted in FIG. 1 are also able to communicate with each other via direct communication links that are not depicted in FIG. 1 to simplify the explanation.

In some embodiments, the ML models disclosed herein include appropriate classifiers and ML methodologies. Some of the ML algorithms include (1) Multilayer Perceptron, Support Vector Machines, Bayesian learning, K-Nearest Neighbor, or Naive Bayes as part of supervised learning, (2) Generative Adversarial Networks as part of Semi Supervised learning, (3) Unsupervised learning utilizing Autoencoders, Gaussian Mixture and K-means clustering, and (4) Reinforcement learning (e.g., using a 0-learning algorithm, using temporal difference learning), and other suitable learning styles. Knowledge transfer is applied, and, for small footprint devices, Binarization and Quantization of models is performed for resource optimization for ML models. Each module of the plurality of AI models is able to implement one or more of: a Language Model, regression algorithm (e.g., ordinary least squares, logistic regression, stepwise regression, multivariate adaptive regression splines, locally estimated scatterplot smoothing), an instance-based method (e.g., k-nearest neighbor, learning vector quantization, self-organizing map), a regularization method (e.g., ridge regression, least absolute shrinkage and selection operator, elastic net), a decision tree learning method (e.g., classification and regression tree, iterative dichotomiser 3, C4.5, chi-squared automatic interaction detection, multivariate adaptive regression splines, gradient boosting machines), a Bayesian method (e.g., naïve Bayes, averaged one-dependence estimators, Bayesian belief network), a kernel method (e.g., a support vector machine, a radial basis function, a linear discriminate analysis), a clustering method (e.g., k-means clustering, expectation maximization), an associated rule learning algorithm (e.g., an Eclat algorithm), an artificial neural network model (e.g., a Perceptron method, a back-propagation method, a self-organizing map method, a learning vector quantization method), a deep learning algorithm (e.g., a restricted Boltzmann machine, a deep belief network method, a convolution network method, a stacked auto-encoder method), and a dimensionality reduction method (e.g., principal component analysis, partial least squares regression, multidimensional scaling). In some embodiments, each processing portion of the system 100 is able to additionally leverage: a probabilistic, heuristic, deterministic or other suitable methodologies for computational guidance, recommendations, machine learning or combination thereof. However, any suitable machine learning approach is able to otherwise be incorporated in the system 100. Further, any suitable model (e.g., machine learning, non-machine learning) can be used in the system 100 of the present disclosure.

Figure 2A:
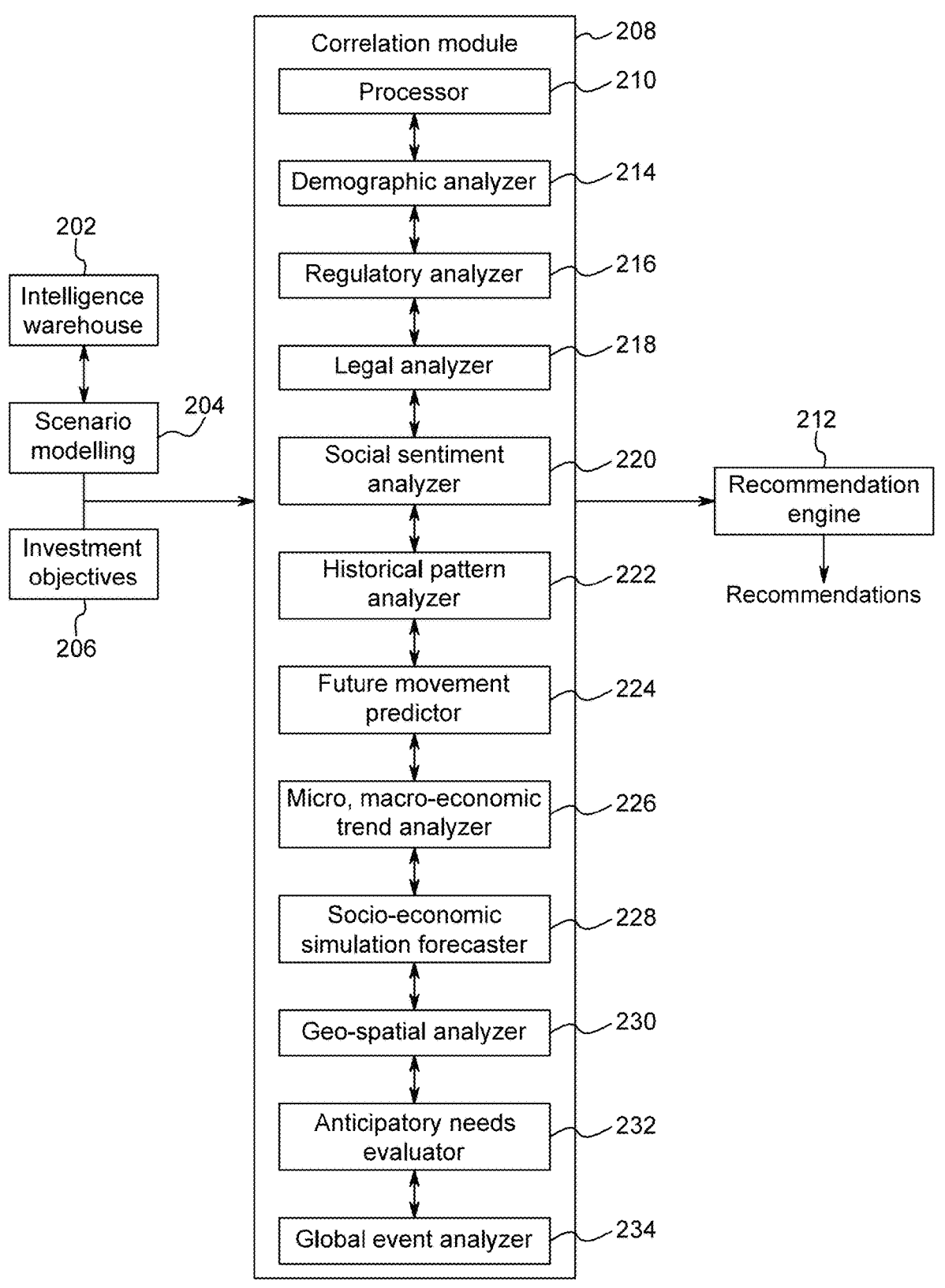
FIG. 2A illustrates an example computational system in accordance with the disclosed embodiments.

FIG. 2A illustrates an example computational system in accordance with the disclosed embodiments. The computational system includes intelligence warehouse 202, which corresponds to the intelligence warehouse 103 as shown in FIG. 1. The intelligence warehouse 202 feeds data into and receives information from scenario modelling 204 that plays and/or validates multiple scenarios associated with the project and/or a query. In some embodiments, the scenario modelling 204 is a part of the model ensemble 112. Scenario modelling 204 runs the exemplary scenario and provides a corresponding output to the correlation module 208.

In some embodiments, scenario modelling 204 is able to vary one or more parameters associated with a project and/or a query to run different scenarios. An exemplary scenario is able to include varying a combination of parameters, for example, mortgage rate is increased significantly, unemployment rate is increased significantly, and the GDP is decreased for a specific location. As one or more intervening influences and/or parameters are varied by the user and/or the system, the system is able to track each data and/or parameter's influence in isolation at first. For this, the system is able to generate a base prediction. The scenario influencers are then able to be applied on the base predictions. For example, if the mortgage rate is varied, for example, increased to a specific number, the system recasts the prediction for Home sales, Days on Market, among other metrics, by applying this new mortgage rate as an input parameter to the model ensemble associated with the scenario modelling 204. The scenario modelling 204 and/or the associated model ensemble is then able to include this newly recast data with appropriate weight and recalculate and/or update the prediction accordingly.

Further, if more than one parameter is varied, say the mortgage rate increases and the unemployment rate increases, then the scenario modelling 204 and/or the associated model ensemble will use a combinatorial evaluation of these new input data with the rest of the data interpolations, as will be described later with reference to FIG. 2H, to cast its predictions.

In some embodiments, the scenario modelling 204 and/or the associated model ensemble are able to run a what-if analysis, for example, what-if the mortgage rate remained the same over the next five years, what if the mortgage varied by 10-20%, what if the population projection increases, and the like. Some of these are probabilistic computations by the scenario modelling 204 and/or the associated model ensemble and the techniques employed are able to include machine inference through Expectation Maximization as Dynamic factor, Directed and Non-Directed graphs, Swarm agents to look for specific patterns in the forecast, greedy algorithm, Bayes and Mark models, and the like. In some embodiments, the system is also able to employ Stochastic Models to look for events that could impact the prediction and which should be factored in for scenario analysis in anticipation of the future.

In some embodiments, the output of the scenario modelling 204 are able to include a projected sales price for a location based on the combination of parameters analyzed by the scenario modelling 204 as part of the exemplary scenario. Similarly, multiple other scenarios are able to be run and/or played by the scenario modelling 204 and corresponding outputs are able to be provided to the correlation module 208 for further analysis and processing.

The computational system further includes investment objectives 206. Investment objectives 206 may be associated with an investment project. The one or more objectives associated with the investment project are able to be provided by the user or inferred through one or more inputs provided to the system. The investment objectives are able to be short-term and/or long-term objectives, as described above. In some embodiments, the investment objectives 206 include a plurality of user objectives. Each of the plurality of data feeds in the knowledge database 132 is processed to achieve one or more investment objectives in the investment objectives 206. The investment objectives are able to include short-term and/or long-term goals. For example, an investment objective is able to be to identify appropriate geographies for procuring land to build residential properties from a long-term perspective. Another objective is able to be to identify markets to invest in for a short-term investment. Yet another objective is able to be to compute and/or predict sales velocity, that is, determine how long does it take to sell a house, what is the average sale price of a unit in a particular geography, how many houses are selling in the current market conditions in a month or a quarter or a year, and the like. Another set of objectives is able to be to identify where to buy land, when to buy land, type of house that should be constructed on the land, how many houses to build based on projected sales velocity, how much to price the house, and the like. Yet another set of objectives is able to be to identify where to build a factory or renting versus building for sale. In this case, the investment objective is able to include determining how long to rent a unit, what should the optimal rent be, should it be a rent and own model, and the like.

As shown in FIG. 2A, scenario modelling 204 and investment objectives 206 are able to be coupled to the correlation module 208. It should be noted that one or more of the model ensemble 112, controller 114, the notifier 116, the monitor 118 and the modifier 120, as shown in FIG. 1 are able to be implemented functionally as the correlation module 208 and/or recommendation engine 212, as shown in FIG. 2A.

In some embodiments, the correlation module 208 conducts a combinatorial analysis of the plurality of data sources by applying a plurality of ensembles of machine learning models to each of the plurality of data sources. For example, the correlation module 208 is able to identify relationships between various data streams and then channelize the learnings to form correlation and/or linkages between data. That is, the correlation module 208 is able to build relationships within the data sets and/or data streams that may appear unrelated, and utilize computational, mathematical, and statistical models and machine learning algorithms to correlate the seemingly unrelated data. For example, the correlation module 208 is able to receive multiple scenario outcomes from the scenario modelling 204, and correlate these to the data from the investment objectives 206, and other parameters, such as, but not limited to, location information, nature of land and surroundings, historic and current appreciation, relatable patterns from comparable topography, population composition, nature of work, Industries, quality of life, and more. Each of these metrics is given a specific score and analyzed individually and in combination with other data. The correlation module 208 is then able to analyze the relevance of each of the data metrics and correlate these to determine the influence of each of the data metrics on moving closer towards the given objective. The correlation module 208 and/or the associated model ensemble is able to use modeling techniques such as, but not limited to, semantic network, transformer models, sentence embeddings using Siamese BERT- Networks, Neural Networks, statistical correlations, trend prediction, Clustering techniques, decision trees, decision forest, nearest neighbor computation, and the like. Since the ensemble uses multiple models, each incentivized to get closer to the set objective, different models are able to employ one or more of the above algorithmic techniques to achieve the objective. The correlation module 208 is able to take the output of each model's computation and may evaluate the combined result to generate an output.

In some embodiments, the correlation module 208 includes a plurality of submodules. The submodules are able to include a processor 210, demographic analyzer 214, regulatory analyzer 216, legal analyzer 218, social sentiment analyzer 220, historical pattern analyzer 222, future movement predictor 224, micro, macro-economic trend analyzer 226, Socio-Economic simulation forecaster 228, Geo-Spatial analyzer 230, Anticipatory needs evaluator 232, and Global event analyzer 234. One or more of these submodules are able to be implemented using software, hardware, firmware, or a combination thereof. In some embodiments, one or more submodules are able to implement and use AI, ML, and cognitive methods for implementation of their associated functionalities.

The processor 210 performs the methods described in accordance with the embodiments of the present disclosure. The processor is able to be programmed into the integrated circuits of the processor, or loaded in memory, storage device, or network, or combinations thereof.

The demographic analyzer 214 accesses data associated with a demography or demographic conditions of an area or a locality and processes the accessed and/or generated data to provide insights into the demographic factors. The demographic analyzer 214 is further able to include submodules, such as, but not limited to, Population growth: past and anticipated, Industries: present and future, Nature of work, Anticipated Migratory patterns, Jobs and employment potential, Proximity to attractions, Weather and livability, Commercial warehouses, Planned permits, Anticipated traffic and commute patterns, Academia, Environmental analysis, and the like.

Similarly, the regulatory analyzer 216 is further able to include one or more submodules configured to access data associated with regulatory requirements associated with an area or a locality and to process the accessed and/or generated data to provide insights into the regulatory and/or zoning factors. The one or more submodules of the regulatory analyzer 216, are able to include, but are not limited to, zoning (e.g., residential, commercial, industrial, no-build zones), building type (e.g., retail, single family, townhouse, multi-family), lot and/or height restrictions, floor area ratio, natural preservation zones, and the like. In some embodiments, the regulatory analyzer 216 is able to track, monitor, or anticipate changes in geopolitical scenario, new regulations, new zoning requirements, such as, an upcoming high school and/or a protected zone, and the like.

Further, in some embodiments, the legal analyzer 218 includes one or more submodules configured to access data associated with legal requirements associated with an investment project in an area or a locality and to process the accessed and/or generated data to provide insights into the legal factors. The one or more submodules of the legal analyzer 218, are able to include, but are not limited to, legal implications based on building type (e.g., factory, family home), Electricity and/or water-based regulations, ownership rights and regulations, building permits, and the like. In some embodiments, the regulatory analyzer 216 and/or the legal analyzer 218 are able to fetch input data from various sources, via the intelligence warehouse 202, such as, but not limited to, judicial records, county data, and the like.

In some embodiments, the social sentiment analyzer 220 includes one or more submodules configured to access or predict data associated with social sentiments of residents in an area or a locality, or micro and macro economies, and to process the accessed and/or generated data to provide insights into the factors associated with social sentiments of the society at large or a segment of the society. The one or more submodules of the social sentiment analyzer 220, are able to include, but are not limited to, location based social sentiments, race and/or ethnicity based social sentiments, government and/or ruling body based social sentiments, and the like. In some embodiments, the social sentiment analyzer 220 is able to fetch input data from various sources, via the intelligence warehouse 202, such as, but not limited to, social media platforms, public chat forums, social news aggregator platforms, and the like.

In some embodiments, the historical pattern analyzer 222 includes one or more submodules configured to examine past data and trends, and to process the accessed and/or generated data to provide insights into the historical patterns related to real-world entities and/or trends. The one or more submodules of the historical pattern analyzer 222, are able to include, but are not limited to, market trends, rental rates, risk patterns, resilience patterns and trends, and the like. In some embodiments, the historical pattern analyzer 222 is able to fetch input data from various sources, via the intelligence warehouse 202, such as, but not limited to, public government records, real estate listings, commercial databases, and the like.

In some embodiments, the future movement predictor 224 includes one or more submodules configured to predict and/or forecast future trends, price movements, market dynamics, and to process the accessed and/or generated data to provide insights into the potential future scenarios. The one or more submodules of the future movement predictor 224, are able to include, but are not limited to, historical and current market trends, advanced analytical tools, technology trends, geo-political trends, and the like. In some embodiments, the future movement predictor 224 is able to fetch input data from various sources, via the intelligence warehouse 202, such as, but not limited to, financial institutions, public government records, real estate listings, commercial databases, and the like.

In some embodiments, the micro, macro-economic trend analyzer 226 includes one or more submodules configured to analyze the broader and granular economic factors, and to process the accessed and/or generated data to provide insights for the decision making. The one or more submodules of the micro, macro-economic trend analyzer 226, are able to include, but are not limited to, GDP growth rates, inflation rates, employment trends, interest rates, government policies, consumer behavior, supply and demand dynamics, and the like. In some embodiments, the macro-economic trend analyzer 226 is able to fetch input data from various sources, via the intelligence warehouse 202, such as, but not limited to, government budget and policies, consumer surveys, economic research institutions, financial markets, and the like.

In some embodiments, the socio-economic simulation forecaster 228 includes one or more submodules configured to predict the future state of socio-economic conditions, and to process the accessed and/or generated data to provide insights on their potential impacts on markets, societies, and the like. The one or more submodules of the micro, socio-economic simulation forecaster 228, are able to include, but are not limited to, scenario analysis, impact assessment, risk management, demographic data, economic indicators, social trends, and the like. In some embodiments, the micro, socio-economic simulation forecaster 228 is able to fetch input data from various sources, via the intelligence warehouse 202, such as, but not limited to, census data, industry reports, cultural institutions, environmental institutions, surveys and polls, education and health statistics, government policies, economic institutions, and the like.

In some embodiments, the geo-spatial analyzer 230 includes one or more submodules configured to analyze and/or predict geo-spatial factors and/or relationships, and to process the accessed and/or generated data to provide insights on their potential impacts on markets, societies, and the like. The one or more submodules of the geo-spatial analyzer 230, are able to include, but are not limited to, GPS module, resolution module, scale and coverage module, accuracy and reliability module, interoperability, legal and ethical considerations, and the like.

In some embodiments, the anticipatory needs evaluator 232 includes one or more submodules configured to anticipate and/or predict the needs of a user, a client and/or a system, and to process the accessed and/or generated data to provide insights on their potential impacts on markets, societies, and the like. The one or more submodules of the anticipatory needs evaluator 232, are able to include, but are not limited to, market trends, historical data, consumer preferences and behaviors, economic indicators, social trends, and the like.

In some embodiments, the global events analyzer 234 includes one or more submodules configured to assess international events to provide insights on their potential impacts on markets, societies, and the like. The one or more submodules of the global events analyzer 234, are able to include, but are not limited to, monitoring and analysis, impact assessment, risk assessment, strategic planning, compliance and legal advisory, and the like.

The recommendation engine 212 receives the processed data from the correlation module 208 and generates recommendations associated with the investment project. The recommendations are discussed further below.

In an example, the system described herein takes in the objectives of a real estate investment plan and provides recommendations in terms of the sales velocity and other parameters that are able to be used to objectively determine a particular locality or geographical area for the investment. For example, determining whether to invest in a particular locality given the time it would take to realize the investment or should another geography or locality be considered for the investment. The objectives, for example, are able to be whether the development will be houses for sale, rent, or a combination of both. The system will model different scenarios, for example, 100% sale, 100% rent, or some combination thereof, time to sell, time to rent, rental appreciation over a period, as well as sales velocity, that is, average days on market, sale to available inventory ratio, sale price increase or decrease over time, market parameters like interest rates, employment in the area, local economy and provide suitable recommendations in terms quantified numbers (e.g., return on investment), percentage of growth.

In another example, the system analyzes existing market data and is able to determine that it is not suitable for new investment as the market may be saturated, that is, the land may be saturated, and there may not be many opportunities to enter the market. Instead, the system is able to identify nearby locations in the proximity of the original area. From a return-on-investment perspective, the system is able to provide recommendations where another development can spawn around a particular location and identifies lands and places where houses is able to be built to reap the rewards of such a targeted investment.

Based on a generic input, for example, "where are the investment opportunities in real estate in the state of Florida", the system analyzes several related and seemingly unrelated data sources to recommend, say, the top five geographies for buying land and building houses. The system internalizes several metrics for a particular geography, say Florida, and then presents in some weighted order a list of localities where an investment could be made at a high level.

The system also presents other metrics such as economic outlook, and predictive analytics such as number of houses expected to be sold in a given period, growth in prices. The output is able to be an optimistic outcome based on the models learning and repeatable patterns from the past number of years or a conservative outcome which additionally factors in the macro and the micro economic indicators. The system is able to provide a range of values instead of absolute numbers as well.

As described above, the system builds relationships between various data inputs using AI/ML models and based on those graphical relationships, the system provides solutions by correlating data sets that are otherwise not possible correlate or have not been done so. The system's recommendation engine analyzes multiple input data streams that appear uncorrelated or unrelated and identifies relationships between these data and then channelizes the learnings from the linkages to provide appropriate recommendations. In other words, the system builds relationships within the data sets/streams that may appear unrelated, and utilizes computational, mathematical, and statistical models and machine learning algorithms to optimize certain parameters to provide decision support for the proposed investment.

The system is able to rely on multiple AI agents, such as, self-learning, supervised, and Human-in-the-loop agents/ models in an ensemble mode with supervisory model evaluation and processing capabilities (e.g., GPU farms) to process and synthesize information to generate recommendations. A fusion of future prediction of each individual model feature, for example, anticipated population growth at a given time, nature and number of employment opportunities at that given time, anticipated traffic patterns in the future, economic influences, visual introspection of land topography, and climatic changes, is able to be generated. The system is able to use multi-modality, that is, various types and veracity of data sources that it may self-generate, for its computation. AI based colonizers and captive agents are able to swarm to a combination of desired objective achieving targets. Some agents are able to predict the future coefficients for such scenarios, and some are able to contest the outcome of a group of agents to generate an output. A combinatorial analysis of these outputs is then able to be evaluated for correlation influences, examined, and compared with the objectives to make the recommendations. The system is also able to analyze the relationships and correlation between the various input data streams to determine if such relationships and correlations are relevant and if the data is relevant, is there a revelation behind it, that is, is there a causality behind it.

With reference to the input data described above, while some of these attributes and/or inputs are readily apparent to have a bearing on the recommendation, the system uncovers several other attributes that may influence the recommendation. For example, industry-wise employment, occupation, ethnic distribution, environmental factors (e.g., histori-cal heavy rainfalls, storm surges, hurricanes), projected environmental impact factors for the next decade or two (e.g., impact of climate change, raise in sea levels, intensity of storms), quality of life, land development. The system also performs similarity pattern analysis, that is, similar to area being considered, is there any correlation or a corollary that existed. Similarly, the system also considers micro and macroeconomic indicators, recessionary forecasts, GDP growth in a combinatorial analysis as inputs in proximity to key developments to forecast what the future is going to look like for a given geography to provide appropriate recom-mendations. The system is able to analyze any number of inputs in addition to the illustrative examples provided to generate the recommendations. For example, in addition to the country level GDP, the system is able to analyze local GDP and/or statewide GDP including city wise GDP to correlate any relationship between GDP and the number of houses being sold or built.

The system is not dependent on user inputs for relevant or irrelevant data nor does the system require any specific guidance. For example, a user does not have to determine or classify the presence of a school or a hospital in the vicinity as being important or significant, the system only requires all the data this is available or that the system is able to retrieve (e.g., from public sources, private repositories, or paid databases). The system then organizes, analyzes, and corre-lates the data to intelligently uncover insights.

Further, the system analyzes the data not merely from a singularity perspective, that is, the system is not merely looking at a specific geographic area (e.g., Fort Myers or Leigh Acres, FL), but also combines or correlates proximal geographic data and recommends a geographic cluster. In some embodiments, the scenario modelling 204 runs mul-tiple different scenarios for different geographic locations, including the specific geographic area and proximal geo-graphic areas. The corresponding outputs of each scenario are provided to the correlation module 208 for further processing to generate a geographic cluster. For example, the system analyzes data for individual cities, but is able to cluster and correlate geographically proximal localities to recommend a geographical cluster or a region. In some embodiments, the clustering or looping is not based on proximity alone, but certain metrics that are similar and generate appropriate recommendations. For example, instead of providing specific geographic areas, the system recommends a region where the chances of returns on investment are higher.

The system's recommendations are also nuanced in the sense that the outcome is predicted not only to an exact point in time, but predicted to be, for example, over a three-month moving window. In addition, the system enables compara-tive analysis of multiple locales, that is, the system is able to group a set of similarly profiled geographic regions and analyze the data patterns and perform combinatorial predic-tion on them. The clustering is performed by multi-factor analysis of similar data patterns. For example, the clustering could be by geographic similarity, demographic similarity, nature of jobs, types of jobs, quality of life, weather pattern, migration pattern, traffic patterns and the like, and antici-pated projection of each data feature. Data analyzed and used in prediction is able to include, for example, historical and current comparable metrics for different housing types, predicted population migration into that locality using a combinatorial analysis and simulation of micro and macro-economic factors, predicted job creation, type and nature of jobs, ethnicity mix of the population, proximity to key societal facilities, planned infrastructure development, qual-ity of life index, historical parity of comparable city, traffic pattern analysis, climatic condition variation and local regu-lations among other factors. The system offers computa-tional weights to each one of the data points singularly and in a permuted combination. A supervisory algorithm and/or a model ensemble is then able to assemble that computed weight in view of the investment objectives for further processing.

Figure 2B:
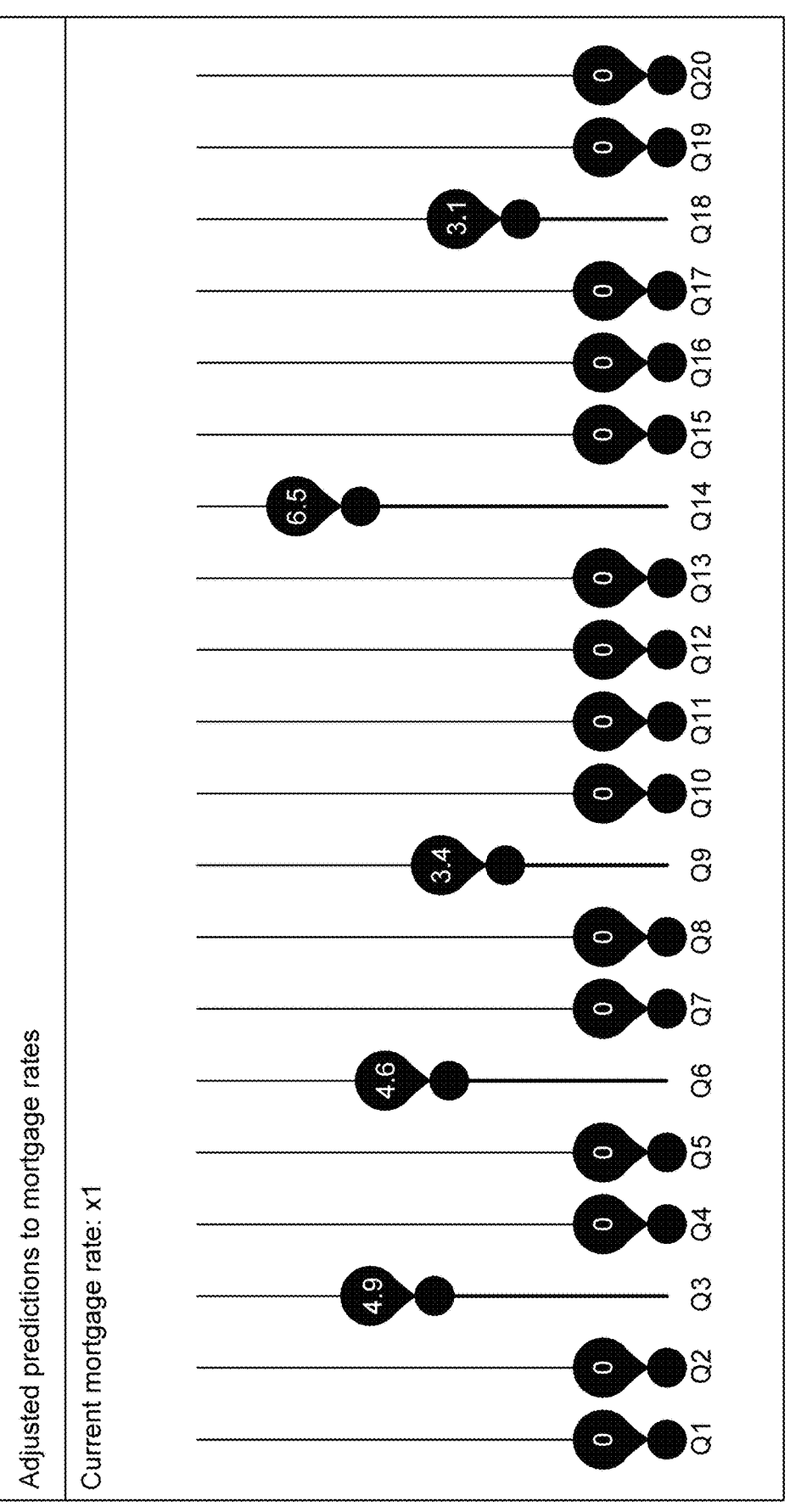
FIGS. 2B-2G illustrate example interaction scenarios associated with the computational system in accordance with the disclosed embodiments.
Figure 2C:
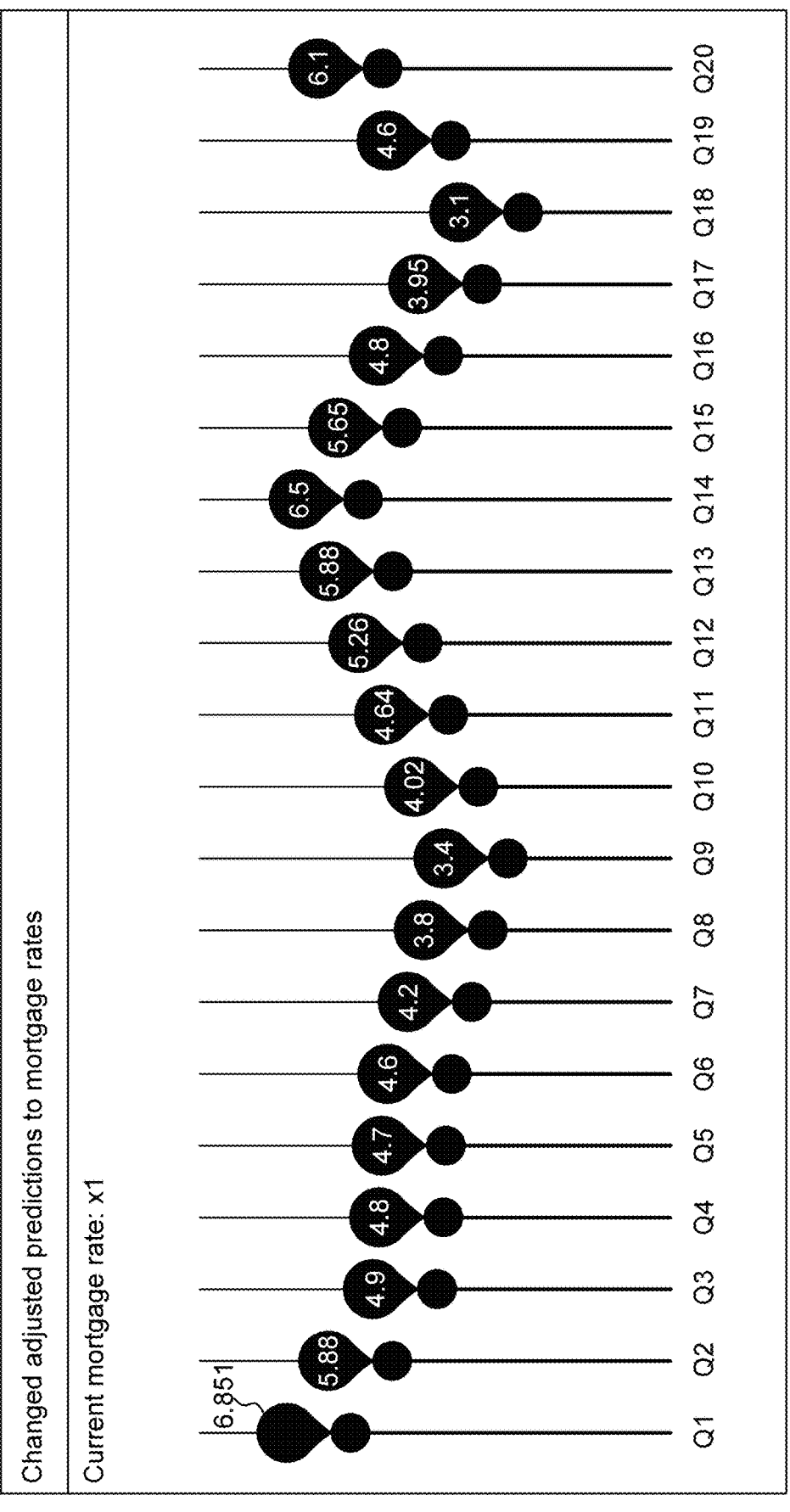

Further, FIGS. 2B-2C illustrate example mortgage rate predictions generated by the system, in accordance with the disclosed embodiments. As described above, the system and/or one or more model ensembles are able to predict a current mortgage rate x1 for a specific location and/or a given time. The system is also able to enable a user and/or another associated system to set and/or make adjustments to the mortgage rate overall, or for specific periods of time, such as, for specific quarters of a year, as shown in FIG. 2B. As shown, a user is able to set specific mortgage rates for Q3, Q6, Q9, Q14, and Q18. The system uses these inputs to intelligently generate realistic and/or progressive predictions for each quarter Q1-Q20 based on the values set and/or adjusted by the user. FIG. 2C depicts the progressive adjust-ments made to each quarter mortgage rate prediction using the values set by the user for Q3, Q6, Q9, Q14, and Q18, while maintaining the current mortgage rate x1.

Figures 2D, 2E:
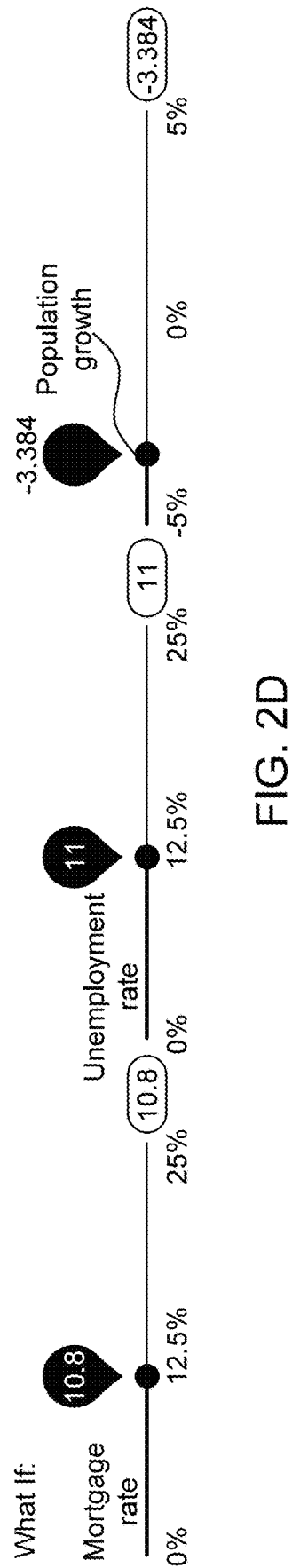

FIGS. 2D-2E illustrate an example what-if scenario gen-erated by the system, in accordance with the disclosed embodiments. As described above, the system and/or one or more model ensembles are able to run multiple scenarios varying one or more data attributes and/or features to generate and/or adjust predictions. In some embodiments, a user is able to provide what-if scenarios to the system. For example, as shown in FIG. 2D, a user is able to move the scale to increase the mortgage rate for a specific location and/or a given time by 10.8%, increase the unemployment rate by 11%, and decrease the population growth by 3.384%. Based on these inputs, the system is able to adjust predic-tions and provide updated recommendations for desired factors and/or time, as shown in FIG. 2E.

Figure 2F:
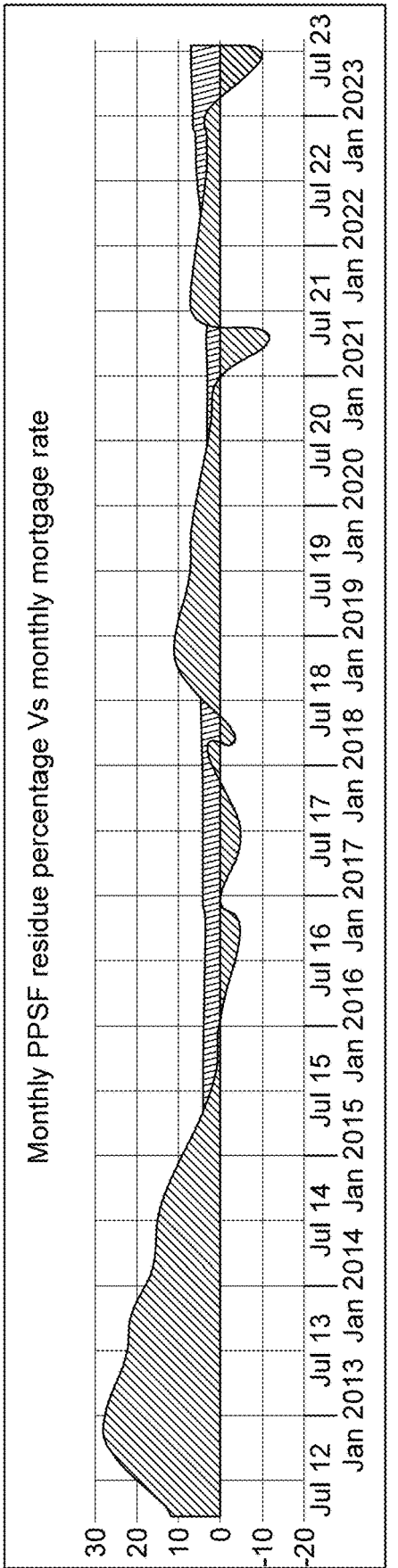
Figure 2G:
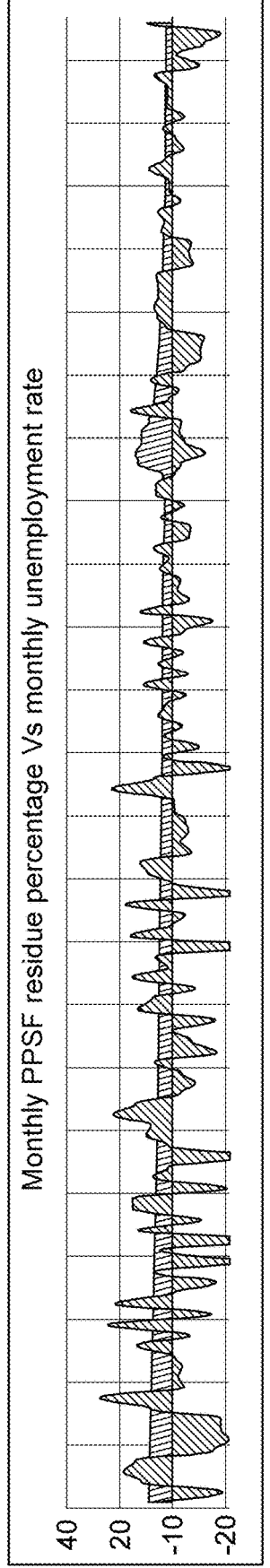

FIGS. 2F-2G illustrate example outputs and/or predic-tions generated by the system, in accordance with the disclosed embodiments. FIG. 2F illustrates monthly price per sq. foot residue percentage versus monthly mortgage rate predictions for a specific time period. FIG. 2G illustrates monthly price per sq. foot residue percentage versus monthly unemployment rate predictions for a specific time period.

Figure 2H:
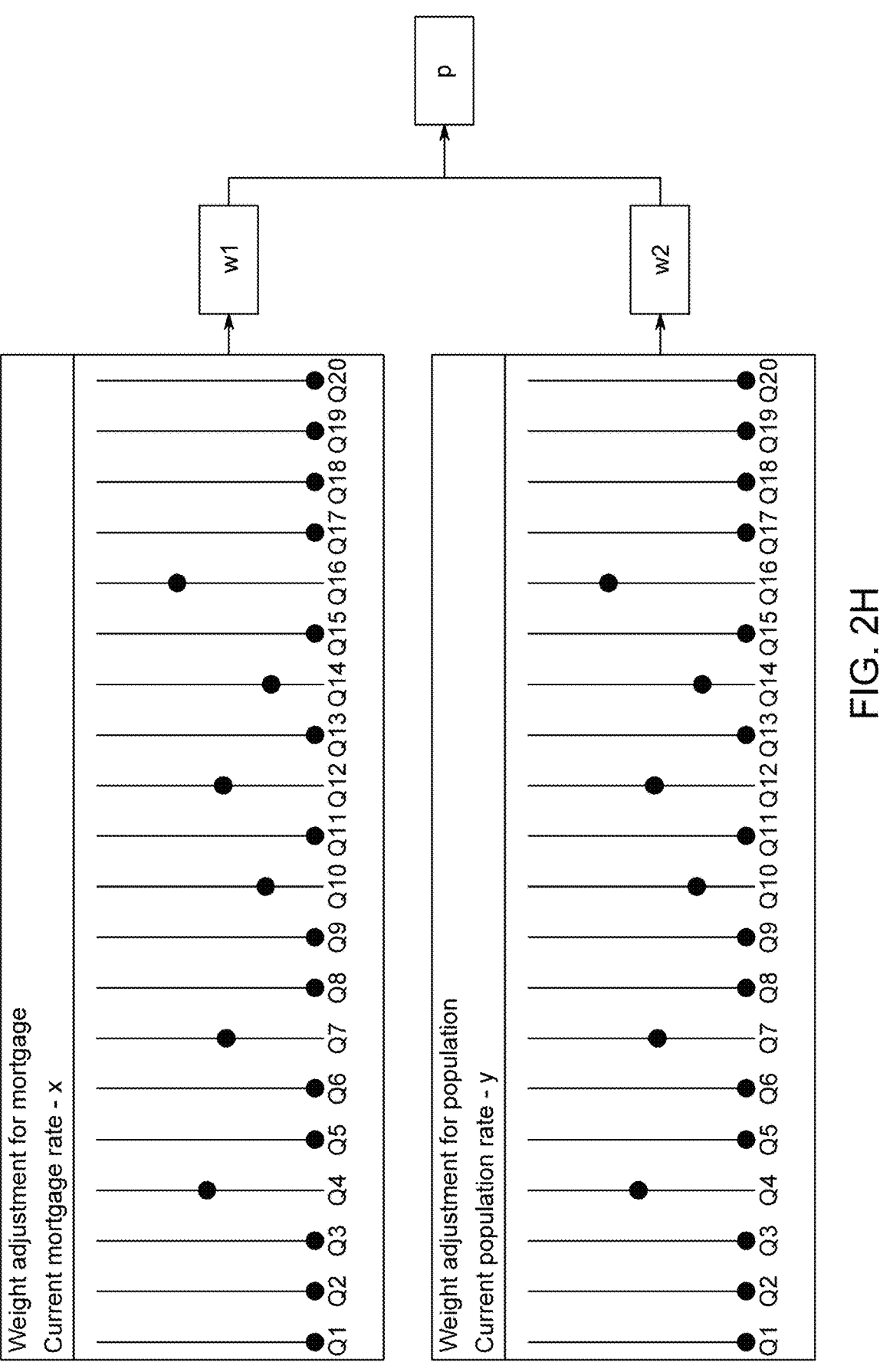
FIG. 2H illustrates an example weights computational system in accordance with the disclosed embodiments.

FIG. 2H illustrates an example weights computational system in accordance with the disclosed embodiments. As described above, the system and/or one or more model ensembles decide the weights to assign to parameters for scenario modelling and/or correlation analysis to generate weighted outputs.

The weights are able to be determined and/or assigned through a training process. The model ensemble is able to vary assigned weights to minimize the difference between the model's predictions and the actual data or expected data. For example, initially, weights are able to be assigned random values and the model and/or model ensemble is able to make predictions based on the current weights. Further, the model's predictions are able to be compared to the actual target values using a loss function. The goal of training is to minimize the loss function. Thus, the model is able to calculate the gradient of the loss function with respect to each weight by using several computational techniques, such as, but not limited to, the chain rule. Thus, the model adjusts its weights to decrease the loss, that is, if a weight's adjustment leads to a decrease in loss, the gradient will be negative, indicating the weight should be increased, and vice versa. Lastly, the model is able to update its weights using the gradients calculated during backpropagation. This is able to be done with an optimization algorithm, such as, but not limited to, Gradient Descent, and the like. These steps are able to be repeated for many iterations over an entire dataset, gradually improving the model's weights and, consequently, its predictions. Throughout this iterative process, the model "learns" by adjusting its weights to minimize the loss, thereby improving its accuracy in making predictions based on the input data it receives.

For example, as shown in FIG. 2H, when trying to maximize profit on a land investment based on parameters like mortgage rate and population projection in an area, a predictive model ensemble is able to be constructed where the weights assigned to these parameters indicate their relative importance in predicting land investment profit. Firstly, the scenario modelling and/or model ensemble is able to collect data, such as, historical mortgage rates at the time of each investment, Population projections at the time of each investment for the area of interest. Further, the model ensemble and/or a user are able to define and/or vary these parameters. For example, a data bar is able to be used to define adjustments in mortgage rates and population projections for one or more quarters. The system is able to define initial weights w1 and w2 associated with the mortgage rate and the population projection, as shown in FIG. 2H. The system is then able to choose one or models that may capture the relationship between these parameters, that is, mortgage rates, population projections, and the target variable, that is, profit, p. In an example, the system is able to use, one or more of Linear regression, decision trees, random forests, neural networks, and the like. The model ensemble is then able to use an optimization algorithm to adjust the weights through a training process. This may include predicting profit, p, using the current weights, calculating the error between the predicted profit and actual profit, adjusting the weights to minimize this error across all training data points, and interpreting the weights w1 and w2 accordingly. After training, each parameter will have an associated weight.

For example, Mortgage rate weight, w1, is able to indicate how changes in the mortgage rate affect the profit. A negative weight suggests higher mortgage rates decrease profit, while a positive weight suggests lower mortgage rates increase profit. Population projection weight, w2, is able to indicate the impact of population projections on profit. A positive weight would imply that higher population projections are able to be associated with higher profits. For example, if the trained model ensemble assigns a weight of −2 to the mortgage rate w1 and +3 to the population projection w2, it suggests that increasing the mortgage rate by 1 unit (e.g., 1 percentage point) is expected to decrease the profit by 2 units. Similarly, increasing the population projection by 1 unit (e.g., 1,000 people) is expected to increase the profit by 3 units.

Further, in some embodiments, a supervisory algorithm is able to assemble the weighted outputs generated by one or more weights computational systems in view of the overall investment objectives to generate the computational predictions.

Figure 3:
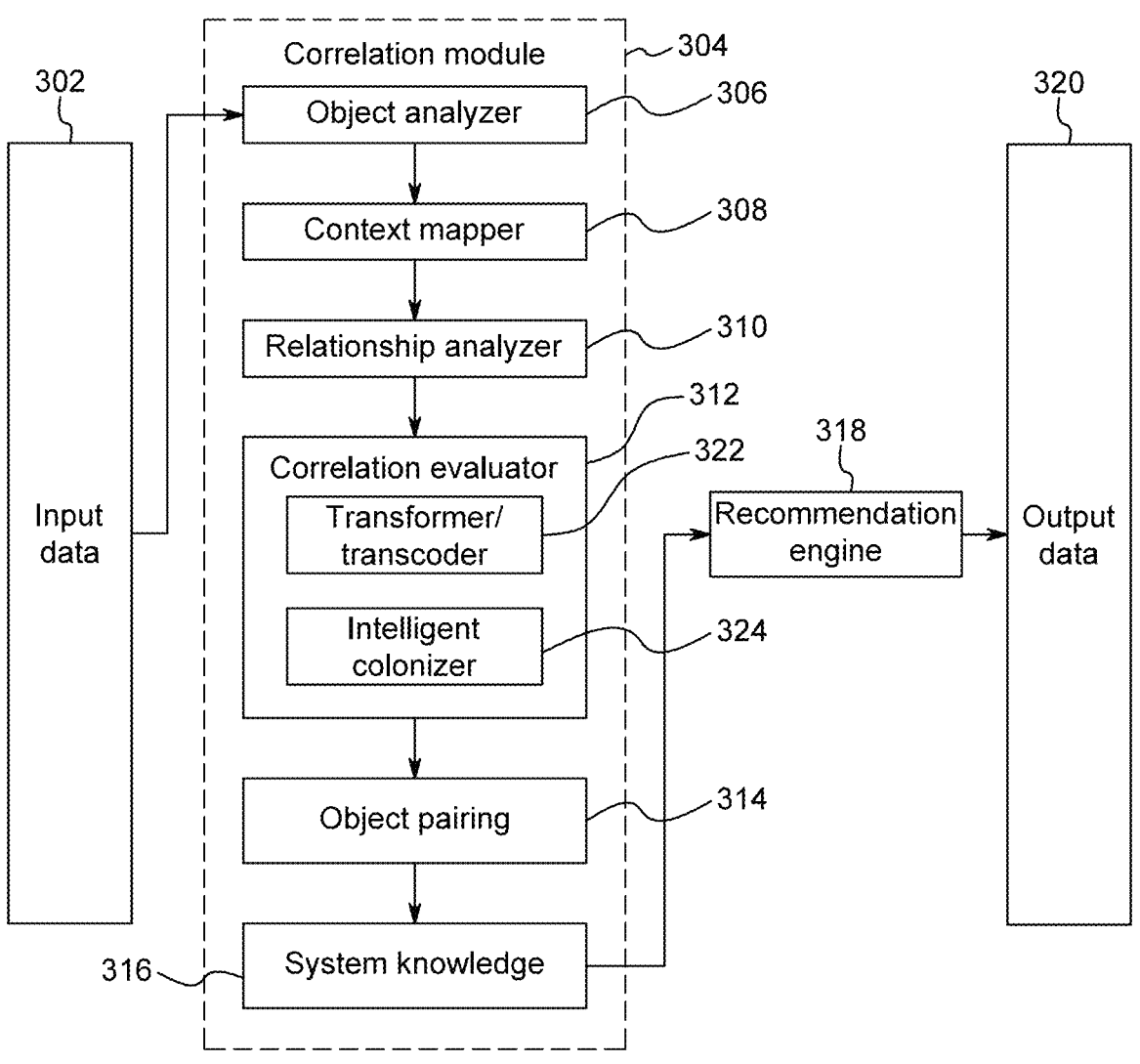
FIG. 3 illustrates another example of the computational system in accordance with the disclosed embodiments.

FIG. 3 illustrates another example computational system in accordance with the disclosed embodiments. The computational system includes a correlation module 304 and a recommendation engine 318. The computational system receives input data 302 and generates output data 320. The system internalizes several metrics for a particular geography and then presents in some weighted order a list of localities where an investment could be made at a high level. In some embodiments, the input data 302 is able to be received as user input entered at a client computer 104 (e.g., via a graphical user interface) and/or received from one or more databases of the intelligence warehouse 130. In some embodiments, the input data 302 is able to be data determined or otherwise generated by the server computer 106 based on user input and/or information from the intelligence warehouse 130. The input data 302 is for an investment project. Examples of input data are able to include Prices and Home Sales Data, such as, age of inventory, average price drop ratio, average sale to list, homes delisted, inventory, median days on market, new listings, percent active listings delisted, percent of median active listings with price drops, building permits, and the like.

The input data is able to include Quality of Life data, such as, livability & schools, median home price, median rent, median household income, median individual income, median age, traffic indicators, yearly school ratings for schools, livability score at neighborhood level and at city level, and the like. Livability score is able to be calculated based on factors like amenities, cost of living, crime, employment, housing, schools & user ratings.

The input data is able to further include Population Demographics data, such as, population year wise for zip codes, yearly school ratings, total employment data for a city year wise, age wise employment, industry wise employment, occupation & ethnic distribution, and the like.

The input data is also able to include Quality of life data, such as, a grade based on factors like schools, housing, nightlife, diversity, jobs, commute, cost of living, weather.

The input data is able to further include Economic Indicators, such as, planned commercial development, interest rates, recessionary forecast, GDP growth, inflation rate, and economic data at state and metro/city level. The input data is also able to include data associated with proximity to attractions, department stores, universities, schools, hospitals, proximity to national and state highways, proximity to key development opportunities.

In some embodiments, the input data is received by correlation module 304, which corresponds to the correlation module 208 as shown in FIG. 2A. That is, the correlation module 304 is able to include one or more of the submodules of correlation module 208, as discussed in FIG. 2A. Additionally, the correlation module 304 is able to include object analyzer 306, context mapper 308, relationship analyzer 310, correlation evaluator 312, object pairing 314, and system knowledge 316 submodules. One or more of the above submodules are able to be implemented using software, hardware, firmware, or a combination thereof. In some embodiments, one or more modules are able to implement and use AI, ML, and cognitive methods for implementation of their associated functionalities.

In some embodiments, the object analyzer 306 is able to determine and/or infer one or more objectives associated with the investment project. The one or more objectives associated with the investment project are able to be provided by the user or inferred through one or more inputs provided to the system. An example system for and method of determining intent and objectives are described in U.S. Provisional Application No. 63/324,715, filed Mar. 29, 2022, and titled "System and Methods for Intent-Based Factorization and Computational Simulation," and U.S. patent application Ser. No. 17/894,418, filed Aug. 24, 2022, titled "System and Method for Computational Simulation and Augment/Virtual Reality in a Construction Environment," the entire contents of which are both hereby incorporated herein by reference for all purposes as if fully set forth herein. The investment objectives are able to be short-term and/or long-term objectives, as described above. The determined objective is provided to context mapper 308. In some embodiments, the context mapper 308 module is able to be configured to map the investment objective(s) with a context relevant to the project, a current scenario or a user input. Further, the relationship analyzer 310 builds relationships between various data inputs using AI/ML models based on the investment objectives and inputs from the context mapper.

Further, in some embodiments, the correlation evaluator 312 identifies relationships between various data streams and then channelizes the learnings to form correlation and/or linkages between data. That is, the system builds relationships within the data sets/streams that may appear unrelated, and utilizes computational, mathematical, and statistical models and machine learning algorithms to correlate the seemingly unrelated data. In some embodiments, the correlation evaluator 312 is able to include a Transformer/Transcoder 322 and an Intelligent Colonizer 324. The correlation evaluator 312 is able to employ the Transformer/Transcoder 322, the Intelligent Colonizer 324, and/or a combination of the two to correlate input data. The correlation evaluator 312 is able to perform introspected analysis of input data. The correlation evaluator 312 is able to employ several different computational algorithms/models, as described above. Some of the algorithms/models are able to include, but are not limited to, an artificial neural network model (e.g., a Perceptron method, a back-propagation method, a self-organizing map method, a learning vector quantization method), a deep learning algorithm (e.g., a restricted Boltzmann machine, a deep belief network method, a convolution network method, a stacked autoencoder method), and the like. Further, the system is able to determine weight associated with different data attributes, which attributes to include, which attributes to include exclude, and the like. The system is also able to employ genetic algorithms/models for a heuristic approach. The genetic algorithms/models are able to be used as a fitness function test during the computation process. For example, if the data attributes indicate that several houses were sold in an area due to lower traffic congestion, the data attribute is able to be regarded unfit as traffic will likely increase when more houses are built and/or sold. The system further analyzes a set of features in a data domain to determine which of these features when sustained and/or enriched will lead to a positive outcome with respect to the set objective. For example, the correlation evaluator 312 is able to mute and/or negate a particular feature to determine what the outcome is. Thus, weights associated with the features are able to be computed in isolation using several computational techniques/model, such as, regressive models, decision trees and/or decision graphs, decision mining, and the like. Once the system determines which features and/or factors are playing a major role associated with the investment objective in an area, the system is able to employ colonizer analysis to determine an optimal path to the end objective. Colonizer analysis conducted by the Intelligent Colonizer 324 will be discussed in detail with reference to FIGS. 4-6.

The object pairing submodule 314 is able to be configured to build pairs of data sets for a comparative analysis. The system knowledge submodule 316 is able to be configured to apply training data, learnt or acquired knowledge and/or historical data to further process the correlated data inputs and/or streams. The recommendation engine 318 receives the processed data from the correlation module 304 and generates recommendations associated with the investment project as the output data 320.

Figure 4:
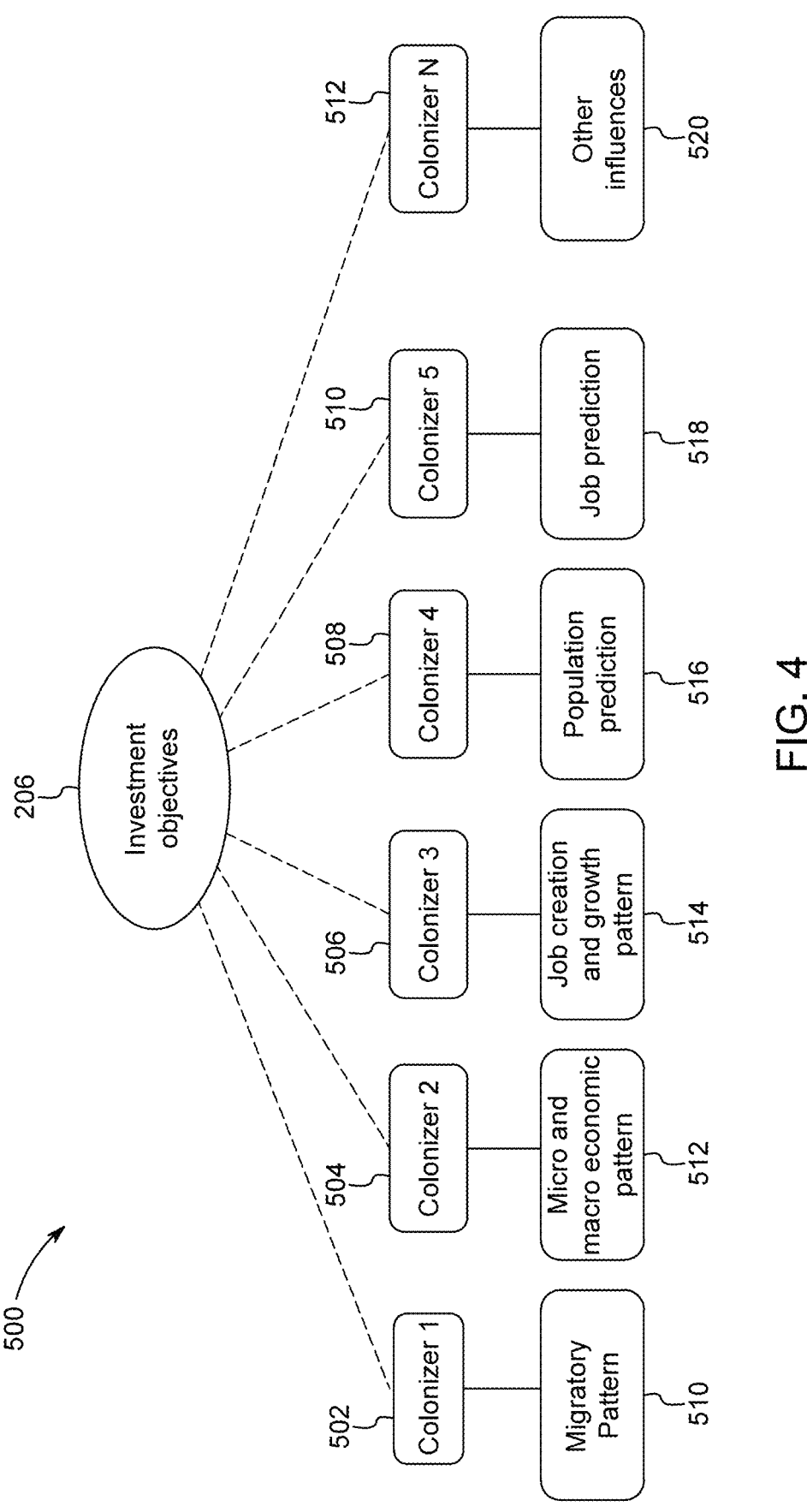
FIG. 4 illustrates an example Intelligent Colonizer in accordance with the disclosed system, according to some embodiments.

FIG. 4 illustrates an example Intelligent Colonizer 500 in accordance with the embodiments of the present disclosure. In some embodiments, the Intelligent Colonizer 500 corresponds to the Intelligent Colonizer 324, as discussed with reference to FIG. 3. The Intelligent Colonizer 500 is able to include multiple Artificial Intelligent (AI) Colonizer and captive agents, such as, Colonizer 1, Colonizer 2, Colonizer 3 . . . , Colonizer N, as depicted in FIG. 4.

The term "AI colonizer" or "colonizer" as used herein refers to a smart entity that performs an action or generates relevant information in order to accomplish a goal and/or a task. The colonizer is able to be a computer program or a module or a system that is designed to process information, perceive its environment, make intelligent decisions, and take one or more actions to achieve a specific goal. Further, the colonizer is able to influence, incentivize, and exercise control or governance over other agents, referred to as "captive agents" or "agents". For example, the AI colonizer is able to direct the actions of captive agents, possibly limiting their autonomy by prescribing specific tasks or roles without allowing deviation from predetermined objectives. In a scenario involving multiple AI colonies, an AI colonizer might control resources, such as computational power, data access, or energy sources and allocate these in a manner that prioritizes its objectives. The colonizer is able to make decisions on behalf of or that significantly affect the captive agents. The AI is able to monitor captive agents' activities to ensure compliance with the colonizer's directives and to gather data for optimizing control strategies.

As shown in FIG. 4, each colonizer (Colonizer 1, Colonizer 2, Colonizer 3, and Colonizer N) is able to be provided with a specific goal. For example, the Colonizer 1 502 is able to be tasked with a goal associated with Migratory Pattern 510, the Colonizer 2 504 is able to be tasked with a goal associated with Micro and Macro Economic Pattern 512, the Colonizer 3 506 is able to be tasked with a goal associated with Job creation and Growth Pattern 514, the Colonizer 4 508 is able to be tasked with a goal associated with Population Prediction 516, the Colonizer 5 510 is able to be tasked with a goal associated with Job Prediction 518, and Colonizer N 512 may be associated with other influences 520. These goals are able to be associated with investment objectives directly or indirectly. In some embodiments, these goals are able to include data attributes or feature weightage analysis, as discussed above. Further, as shown in FIG. 4, each captive agent is also able to simultaneously move towards the investment objectives 206.

Figure 5:
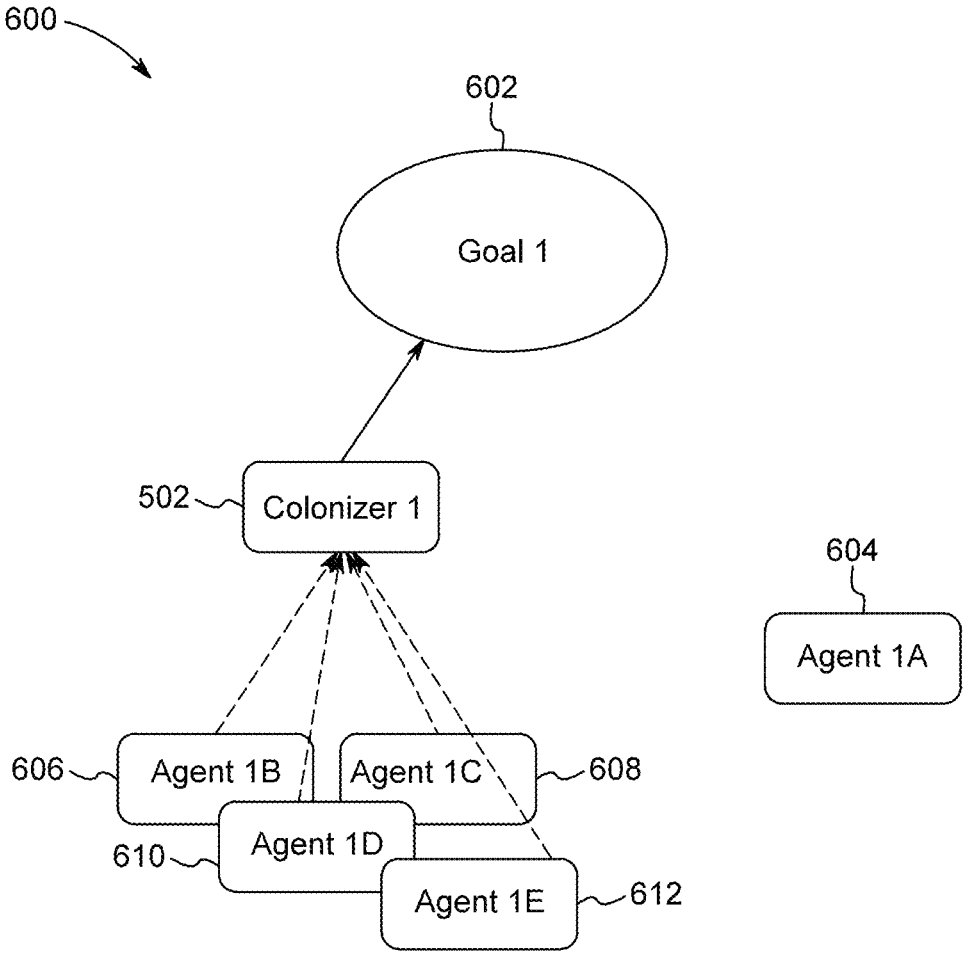
FIG. 5 illustrates a schematic diagram illustrating an example colonizer operation, according to some embodiments.

FIG. 5 illustrates an example Intelligent Colonizer 600 operation in accordance with the embodiments of the present disclosure. In some embodiments, the Intelligent Colonizer 600 corresponds to the Intelligent Colonizer 500, as discussed with reference to FIG. 4. The colonizers and captive AI Agents, as described above, are able to work individually or collectively in a group or a "colony" of agents to generate intermediary output. The term "colony" as used herein refers to a decentralized and self-organized network or system comprising of multiple AI colonizer, peer captains, and captive agents interacting with one another and with the environment. As described above, each colonizer, peer captain, and captive agent is able to be associated with a goal or an objective. However, instead of one AI entity and/or model working to meet the goal, the Intelligent Colonizer 600 includes a colony of colonizers and agents working towards the common goal. As shown in FIG. 5, a colony of AI colonizers and agents, including, at least the Colonizer 1 502, the Agent 1A 604, the Agent 1B 606, the Agent 1C 608, the Agent 1D 610, and the Agent 1E 612 are able to be working towards a Goal 1. As the AI Colonizers and Agents work towards meeting Goal 1, not all AI Agents actively move towards the goal. The AI Colonizers and Agents work collectively, efficiently, and intelligently in meeting the end objective. For example, as depicted in FIG. 5, the Colonizer 1 502 may have moved closer to Goal 1 602, while the Agent 1A 604 may be moving in a different direction exploring other attributes and/or paths. Meanwhile, several other AI Agents, the Agent 1B 606, the Agent 1C 608, the Agent 1D 610, and the Agent 1E 612 may be waiting for other AI Agents to progress. The Colonizer 1 502 is able to identify a set of data attributes or relevant features and generate a positive reinforcement metrics based on its movement towards Goal 1 in order to incentivize and influence other agents, such as, the Agent 1B 606, the Agent 1C 608, the Agent 1D 610, and the Agent 1E 612 to follow the path led by the Colonizer 1 502. The agents may subscribe to the Colonizer 1 502 and follow the path incentivized by the Colonizer 1 502. These agents are referred to as captive agents. For example, the Agent 1B 606, the Agent 1C 608, the Agent 1D 610, and the Agent 1E 612 are captive agents of the Colonizer 1 502. The Agent 1A is able to decide to unsubscribe to the Colonizer 1 502 and follow a different path, other than the one incentivized by the Colonizer 1 502.

In the example, the positive reinforcement metrics are able to include a numeric and/or inferential score calculated by objective evaluation of each AI Colonizer and Agent's performance with respect to the set goal and/or objective. For example, if the Goal 1 is to increase the price per square foot by 50%, each AI Colonizer and Agent is able to run AI analysis, using one or more AI models, on different parameters that play a part in determining the price per square foot. An AI Agent is able to analyze the GDP growth parameter and once the goal is met based on the analysis of the GDP growth parameter, the AI Agent is able to award itself a data point. Similarly, the AI Agent will play different scenarios based on multiple different parameters, and each time the goal is met, a data point is awarded to the AI Agent. All AI Colonizers and Agents will conduct a similar analysis to meet the set objective and/or goal. Finally, a numeric score is able to be calculated for each AI Colonizer and Agent based on the rewarded data points. In some embodiments, the score is able to be a numeric score, that is, a sum of the data points, for example. In other embodiments, the score is able to be an inferential score based on the analysis of how close the AI Colonizer or the Agent was in meeting the set objective and/or goal. These scores are able to be used by the AI Colonizer as the positive reinforcement metrics for influencing other agents to be its captive agents. The Agent 1B 606, the Agent 1C 608, the Agent 1D 610, and the Agent 1E 612 are able to analyze the positive reinforcement metrics and explore the intent behind Colonizer 1's path and subscribe to the Colonizer 1 accordingly. For example, the AI Agents not only analyze the numeric and/or inferential score of the colonizer but also look at how the score was achieved. That is, the intent behind the path set by the colonizer is analyzed by analyzing which data attributes and/or parameters were considered and varied by the Colonizer and what could be the associated causality of that metric.

For example, Goal 1 is able to include studying and analyzing migratory pattern associated with an area and its impact on investment objectives. The Colonizer 1 502, the Agent 1A 604, the Agent 1B 606, the Agent 1C 608, the Agent 1D 610, and the Agent 1E 612 are able to, intelligently, analyze set of data attributes to meet the set objective, that is, Goal 1, and y generate an intermediary output, such as, a preliminary prediction or a recommendation associated with the real-world entity. Further, in some embodiments, one or more colonizers are able to be selected based on the numeric and/or inferential score(s). For example, if two colonizers have similar scores but different paths, both are able to act as colonizers in the colony. Some captive agents are able to follow the first colonizer and others are able to follow the second colonizer. The intelligent colonizer 600 generates a system that is more robust and fault-tolerant than employing a single AI Agent. That is, the intelligent colonizer 600 would be able to continue functioning even when individual AI Agents fail. Further, the intelligent colonizer 600 generates a system that is more flexible and adaptable, as the colonizers and captive agents in a colony learn from each other and quickly change their behavior in response to changes in their environment.

Figure 6:
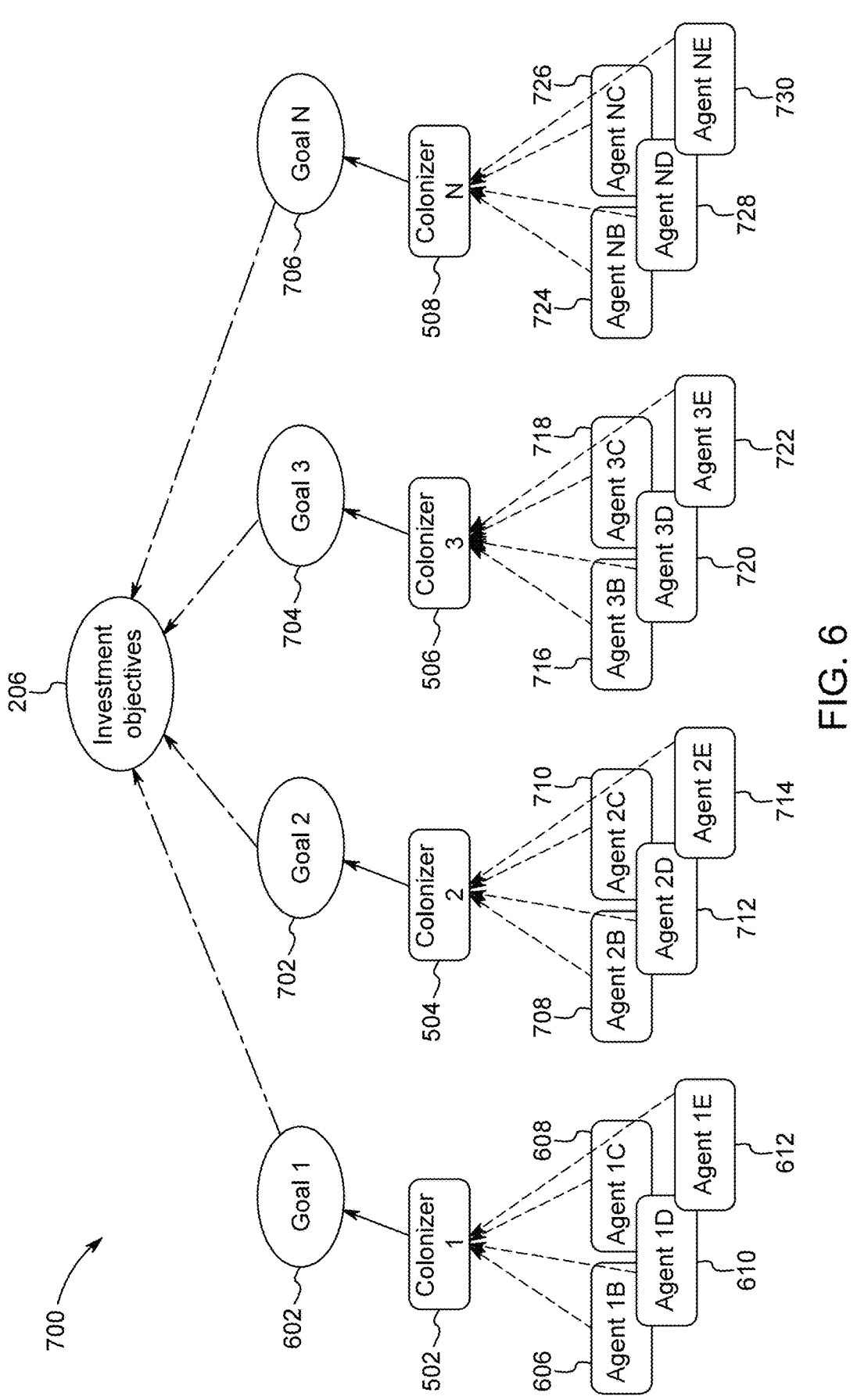
FIG. 6 illustrates a schematic diagram illustrating an example Intelligent Colonizer operation, according to some embodiments.

FIG. 6 illustrates an example Intelligent Colonizer 700 operation in accordance with the embodiments of the present disclosure. In some embodiments, the Intelligent Colonizer 700 corresponds to the Intelligent Colonizer 500, as discussed with reference to FIG. 4. Each colony of colonizers and captive agents as shown in FIG. 6 works with other colonies collectively to meet the investment objectives 206. The Colonizer 1 502, the Agent 1B 606, the Agent 1C 608, the Agent 1D 610, and the Agent 1E 612 are able to be working collectively in a decentralized and self-organized network to meet Goal 1. The Colonizer 2 504, the Agent 2B 708, the Agent 2C 710, the Agent 2D 712, and the Agent 2E 714 are able to be working collectively in a decentralized and self-organized network to meet Goal 2. The Colonizer 3 506, the Agent 3B 716, the Agent 3C 718, the Agent 3D 720, and the Agent 3E 722 are able to be working collectively in a decentralized and self-organized network to meet Goal 3. The Colonizer N 508, the Agent NB 724, the Agent NC 726, the Agent ND 728, and the Agent NE 730 are able to be working collectively in a decentralized and self-organized network to meet Goal N 706. As described above, Goals 1-4 may refer to optimizing an investment objective by varying weightage associated with a feature or a data attribute. Further, an optimal output of all Goals 1-4 is able to be correlated, by the correlation module 304, for example, to meet and/or generate recommendation associated with the investment objectives 206.

In some embodiments, the Colonizers 1-N act as peer captains acting in concert with or in support of each other's goals and directives. The peer captains are able to communicate and coordinate to synchronize their actions and share information efficiently. The peer colonizers are able to coordinate on resource allocation, resolving conflicts, implementing redundancy protocols, and to continually adapt the AI colonies' overall strategy based on new data and changing conditions. The Colonizers 1-N are able to generate one or more intermediary outputs associated with their irrespective goals and overall investment objectives. These intermediary outputs are then able to be weighted and combined to generate weighted outputs as discussed above with reference to FIG. 2H. In some embodiments, the system is able to assign weights to each of the one or more intermediary outputs, generate a first weighted output based on the assigned weights, determine, a difference between the first weighted output and an expected output, and adjust the assigned weights to minimize the difference between the first weighted output and an expected output. The weighted outputs are assembled by a supervisory algorithm in view of investment objectives to generate one or more computational predictions associated with the real-world entity.

FIG. 7 illustrates a method 800 for generating computational predictions associated with a real-world entity in a computing environment, in accordance with embodiments of the present disclosure. FIG. 7 will be explained in conjunction with the description of FIGS. 1 to 6.

At step 802, the system and/or the controller 114 forming a part of the server computer 106 is able to receive and analyze knowledge from a plurality of data sources. In some embodiments, the plurality of data sources corresponds to the intelligent warehouse as shown in FIG. 1. In some embodiments, the system is able to self-generate one or more of the plurality of data sources based on predictive analysis on the plurality of data sources. For instance, the system is able to analyze one or more of historical data sources and current data sources to compute a predictive data source.

At step 804, the system and/or the controller 114 is able to determine one or more investment objectives associated with the real-world entity. For example, as described above, the investment objectives are able to be short-term and/or long-term objectives. In some embodiments, the investment objectives are able to include a plurality of user objectives. For example, an investment objective is able to identify appropriate geographies for procuring land to build residential properties from a long-term perspective. Another objective is able to identify markets to invest in for a short-term investment. Yet another objective is able to compute and/or predict sales velocity, that is, determine how long it takes to sell a house, and the like.

At step 806, the system and/or the controller 114 is able to apply, a plurality of ensembles of machine learning models to each of the plurality of data sources to conduct a combinatorial analysis of the plurality of data sources. For example, as described above, the correlation module 208 is able to identify relationships between various data streams and then channelize the learnings to form correlation and/or linkages between data. In some embodiments, the system is able to train the plurality of ensembles of machine learning models using training data including data relating to the real-world entity and one or more inputs received from a user, and is able to apply the trained plurality of ensembles of machine learning models to each of the plurality of data sources to conduct the combinatorial analysis.

At step 808, the system and/or the controller 114 is able to assign one or more goals to one or more colonies of Artificial Intelligence (AI) colonizers, each colony of AI colonizers comprising a lead colonizer and a plurality of captive agents navigating collectively towards the one or more goals to generate one or more intermediary outputs. Further, the one or more goals are able to correspond to the one or more investment objectives. In some embodiments, the lead colonizer is able to identify a set of relevant features in the plurality of data sources, analyze the set of relevant features in view of the one or more goals to generate a positive reinforcement metrics and an associated path, and incentivize using the positive reinforcement metrics, the plurality of captive agents to move towards the associated path.

At step 810, the system and/or the controller 114 are able to analyze the one or more intermediary outputs in a weighted combination to generate weighted outputs.

At step 812, the system and/or the controller 114 are able to utilize a supervisory algorithm to assemble the weighted outputs based on the one or more investment objectives and accordingly, generate a computational prediction associated with the real-world entity at step 814.

In some embodiments, one or more computer-readable storage media are able to be utilized in implementing embodiments consistent with the present disclosure. A computer-readable storage medium refers to any type of physical memory on which information or data readable by a processor may be stored. Thus, a computer-readable storage medium is able to store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that is able to include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," "able to," and similar terms are used to indicate that an item, condition, or step being referred to is an optional (not required) feature of the invention.

The presently claimed invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This presently claimed invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the presently claimed invention has been described with respect to a limited number of embodiments, those skilled in the art, having benefit of this disclosure, will appreciate that other embodiments are able to be devised which do not depart from the scope of the invention as disclosed herein.

We claim:

1. A method for generating computational predictions in a computing environment comprising one or more computer processors implementing the following:

analyzing knowledge from a plurality of data sources, wherein the analyzing includes self-generating one or more of the plurality of data sources based on predictive analysis on the plurality of data sources;

determining one or more objectives associated with a project;

applying, a plurality of ensembles of machine learning models to each of the plurality of data sources and conducting a combinatorial analysis of the plurality of data sources, wherein the combinatorial analysis comprises:

assigning one or more goals to one or more colonies of Artificial Intelligence (AI) colonizers, each colony of AI colonizers comprising a lead colonizer and a plurality of captive agents navigating collectively towards the one or more goals and generating one or more intermediary outputs, wherein the one or more goals correspond to the one or more objectives;

analyzing the one or more intermediary outputs in a weighted combination and generating weighted outputs;

identifying, by the lead colonizer, a set of relevant features in the plurality of data sources;

analyzing, by the lead colonizer, the set of relevant features in view of the one or more goals and generating a positive reinforcement metrics and an associated path; and incentivizing, by the lead colonizer, using the positive reinforcement metrics, the plurality of captive agents to move towards the associated path;

subscribing, by one or more of the plurality of captive agents, to the lead colonizer based on the positive reinforcement metrics; and collaborating and moving, by the one or more of the plurality of captive agents, towards the associated path as incentivized by the lead agent; and assembling, by a supervisory algorithm, the weighted outputs based on the one or more objectives and generating a computational prediction associated with the project.

2. The method of claim 1, wherein self-generating the one or more of the plurality of data sources includes analyzing one or more of historical data sources and current data sources to compute a predictive data source.

3. The method of claim 1, further comprising:

training the plurality of ensembles of machine learning models using training data including data relating to the project and one or more inputs received from a user; and applying the trained plurality of ensembles of machine learning models to each of the plurality of data sources and conducting the combinatorial analysis.

4. The method of claim 1, further comprising:

unsubscribing, by one or more of the plurality of captive agents, to the lead colonizer based on the positive reinforcement metrics; and moving, by the one or more of the plurality of captive agents, towards another path, different from the associated path as incentivized by the lead agent.

5. The method of claim 1, further comprising:

collaborating, by the lead colonizer, with one or more of peer colonizers, wherein the one or more peer colonizers include lead colonizers in other colonies of AI colonizers; and generating, based on the collaborating, the one or more intermediary outputs.

6. The method of claim 1, wherein generating the weighted output comprises:

assigning, based on a training process, weights to each of the one or more intermediary outputs;

generating a first weighted output based on the assigned weights;

determining, a difference between the first weighted output and an expected output; and adjusting the assigned weights to minimize the difference between the first weighted output and an expected output.

7. A system for generating computational predictions in a computing environment comprising one or more computer processors, the system comprising:

a Correlation Module having a controller configured to:

analyze knowledge from a plurality of data sources, including self-generating one or more of the plurality of data sources based on predictive analysis on the plurality of data sources;

determine one or more objectives associated with a project;

apply a plurality of ensembles of machine learning models to each of the plurality of data sources and conduct a combinatorial analysis of the plurality of data sources, wherein the combinatorial analysis comprises:

assigning one or more goals to one or more colonies of Artificial Intelligence (AI) colonizers, each colony of AI colonizers comprising a lead colonizer and a plurality of captive agents navigating collectively towards the one or more goals and generating one or more intermediary outputs, wherein the one or more goals correspond to the one or more objectives; and analyzing the one or more intermediary outputs in a weighted combination to generate weighted outputs;

identify, by the lead colonizer, a set of relevant features in the plurality of data sources;

analyze, by the lead colonizer, the set of relevant features in view of the one or more goals and generate a positive reinforcement metrics and an associated path;

incentivize, by the lead colonizer, using the positive reinforcement metrics, the plurality of captive agents to move towards the associated path;

subscribe the one or more of the plurality of captive agents to the lead colonizer based on the positive reinforcement metrics; and collaborate and move the one or more of the plurality of captive agents towards the associated path as incentivized by the lead agent; and assemble, using a supervisory algorithm, the weighted outputs based on the one or more objectives and generate a computational prediction associated with the project.

8. The system of claim 7, wherein the controller is further configured to:

analyze one or more of historical data sources and current data sources and compute a predictive data source.

9. The system of claim 7, wherein the controller is further configured to:

train the plurality of ensembles of machine learning models using training data including data relating to the project and one or more inputs received from a user; and apply the trained plurality of ensembles of machine learning models to each of the plurality of data sources and conduct the combinatorial analysis.

10. The system of claim 7, wherein the controller is further configured to:

unsubscribe the one or more of the plurality of captive agents to the lead colonizer based on the positive reinforcement metrics; and move the one or more of the plurality of captive agents towards another path, different from the associated path as incentivized by the lead agent.

11. The system of claim 7, wherein the controller is further configured to:

collaborate the lead colonizer with one or more of peer colonizers, wherein the one or more peer colonizers include lead colonizers in other colonies of AI colonizers; and generate, based on the collaboration, the one or more intermediary outputs.

12. The system of claim 7, wherein the controller is further configured to:

assign weights to each of the one or more intermediary outputs based on a training process;

generate a first weighted output based on the assigned weights;

determine a difference between the first weighted output and an expected output; and adjust the assigned weights to minimize the difference between the first weighted output and an expected output.

13. A non-transitory computer-readable storage medium, having stored thereon a computer-executable program which, when executed by at least one processor, causes the at least one processor to:

analyze knowledge from a plurality of data sources, including self-generating one or more of the plurality of data sources based on predictive analysis on the plurality of data sources;

determine one or more objectives associated with a project;

apply a plurality of ensembles of machine learning models to each of the plurality of data sources and conduct a combinatorial analysis of the plurality of data sources, wherein the combinatorial analysis comprises:

assigning one or more goals to one or more colonies of Artificial Intelligence (AI) colonizers, each colony of AI colonizers comprising a lead colonizer and a plurality of captive agents navigating collectively towards the one or more goals and generate one or more intermediary outputs, wherein the one or more goals correspond to the one or more objectives; and analyzing the one or more intermediary outputs in a weighted combination and generate weighted outputs;

identify, by the lead colonizer, a set of relevant features in the plurality of data sources;

analyze, by the lead colonizer, the set of relevant features in view of the one or more goals and generate a positive reinforcement metrics and an associated path;

incentivize, by the lead colonizer, using the positive reinforcement metrics, the plurality of captive agents to move towards the associated path;

subscribe the one or more of the plurality of captive agents to the lead colonizer based on the positive reinforcement metrics; and collaborate and move the one or more of the plurality of captive agents towards the associated path as incentivized by the lead agent; and assemble, using a supervisory algorithm, the weighted outputs based on the one or more objectives and generate a computational prediction associated with the project.

14. The non-transitory computer-readable storage medium of claim 13, the computer-executable program further causes the at least one processor to:

train the plurality of ensembles of machine learning models using training data including data relating to the project and one or more inputs received from a user; and apply the trained plurality of ensembles of machine learning models to each of the plurality of data sources to conduct the combinatorial analysis.

* * * * *